US012577943B2

(12) United States Patent
Kirkegaard et al.

(10) Patent No.: US 12,577,943 B2
(45) Date of Patent: Mar. 17, 2026

(54) LIGHTNING PROTECTION SYSTEM

(71) Applicant: POLYTECH A/S, Bramming (DK)

(72) Inventors: Mads Kirkegaard, Bramming (DK);
Richard Baker, Bramming (DK); **Lisa
Carloni**, Bramming (DK)

(73) Assignee: POLYTECH A/S, Bramming (DK)

( * ) Notice: Subject to any disclaimer, the term of this
patent is extended or adjusted under 35
U.S.C. 154(b) by 0 days.

(21) Appl. No.: 18/258,640

(22) PCT Filed: Dec. 23, 2021

(86) PCT No.: PCT/EP2021/087468
§ 371 (c)(1),
(2) Date: Jun. 21, 2023

(87) PCT Pub. No.: WO2022/136631
PCT Pub. Date: Jun. 30, 2022

(65) Prior Publication Data
US 2024/0301873 A1      Sep. 12, 2024

(30) Foreign Application Priority Data
Dec. 23, 2020    (EP) .................................... 20216990

(51) Int. Cl.
*F03D 80/30* (2016.01)
*F03D 1/06* (2006.01)
(52) U.S. Cl.
CPC ......... *F03D 80/301* (2023.08); *F03D 1/0679*
(2023.08); *F05B 2240/85* (2020.08); *F05B*
*2280/6003* (2013.01)
(58) Field of Classification Search
CPC ..... F03D 80/30; F03D 80/301; F05B 2240/85
See application file for complete search history.

(56) References Cited

U.S. PATENT DOCUMENTS 10,125,744 B2 * 11/2018 March Nomen ....... F03D 80/30
10,202,966 B2 * 2/2019 Lipka ...................... F03D 80/30
(Continued)

FOREIGN PATENT DOCUMENTS

DE    10 2014 202951 A1    8/2015
EP        2 789 851 B1    1/2016
(Continued)

OTHER PUBLICATIONS

International Search Report dated Apr. 22, 2022 (4 pages) from PCT
Priority Application PCT/EP2021/087468.
(Continued)

*Primary Examiner* — Courtney D Heinle
*Assistant Examiner* — Cameron A Corday
(74) *Attorney, Agent, or Firm* — Crowell & Moring LLP;
Trevor K. Copeland

(57)            ABSTRACT

A lightning protection system for a wind turbine blade
having-a structural element made of fiber reinforced poly-
mer (FRP). The lightning protection system includes a first
down conductor extending from a tip end to a tip connection
block and a second down conductor extending from the tip
connection block between and along the structural element
and a pressure side towards a root connection block. A third
down conductor extending from the tip connection block
between and along the structural element and a suction side
towards the root connection block. The second down con-
ductor includes a first expanded foil or a first mesh and the
third down conductor includes a second expanded foil or a
second mesh. The first expanded foil or first mesh and the
second expanded foil or second mesh include a plurality of
conductive connection points arranged in the vicinity of the
tip and root connection blocks.

23 Claims, 17 Drawing Sheets

(56)     References Cited

U.S. PATENT DOCUMENTS

| | | | |
|---|---|---|---|
| 10,844,843 B2 | 11/2020 | Fujioka et al. | |
| 2006/0280613 A1* | 12/2006 | Hansen | H02G 13/00 |
| | | | 416/230 |
| 2010/0329865 A1* | 12/2010 | Hibbard | F03D 80/30 |
| | | | 174/2 |
| 2011/0182731 A1* | 7/2011 | Naka | F03D 80/30 |
| | | | 416/1 |
| 2012/0007620 A1 | 1/2012 | Nolletti | |
| 2013/0149153 A1* | 6/2013 | Fujioka | H02G 13/00 |
| | | | 416/229 R |
| 2013/0149154 A1* | 6/2013 | Kuroiwa | F03D 1/0675 |
| | | | 416/146 R |
| 2016/0348643 A1 | 12/2016 | Fujioka et al. | |
| 2020/0056596 A1* | 2/2020 | Christiansen | B29C 70/72 |
| 2020/0095983 A1* | 3/2020 | Girschig | F03D 80/507 |
| 2020/0200151 A1 | 6/2020 | Brilliant et al. | |
| 2020/0232444 A1 | 7/2020 | Irissappane et al. | |

FOREIGN PATENT DOCUMENTS

| | | | |
|---|---|---|---|
| EP | 3 098 438 A1 | 11/2016 | |
| JP | 2016-223325 A | 12/2016 | |
| TW | M 438 747 U1 | 10/2012 | |
| WO | WO 2013/084634 A1 | 6/2013 | |

OTHER PUBLICATIONS

International Preliminary Report on Patentability (1 page) dated Jun. 13, 2023 and appended Written Opinion of the International Searching Authority dated Apr. 22, 2022 (6 pages) from PCT Priority Application PCT/EP2021/087468.
Notice of Reasons for Rejection dated Nov. 18, 2025 (11) pages out of corresponding Japanese Application 2023-538807.

* cited by examiner

LIGHTNING PROTECTION SYSTEM

This application is a National Stage application of International Application No. PCT/EP2021/087468, filed Dec. 23, 2021, the entire contents of which are incorporated herein by reference.

This application claims priority under 35 U.S.C. § 119 (a) to European Patent Application No. 20216990.0, filed on Dec. 23, 2020, the entire contents of which are incorporated herein by reference.

DESCRIPTION-BACKGROUND OF THE INVENTION

Field of the Invention

The present invention relates to a lightning protection system for a wind turbine blade, the wind turbine blade comprises a root end and a tip end and a longitudinal axis, a pressure side and a suction side, the pressure side and the suction side are the outer faces of the wind turbine blade, and a structural element extending along the longitudinal axis, the structural element is a spar or beam made of fibre reinforced polymer (FRP).

DESCRIPTION OF THE RELATED ART

Most known lightning protection systems for wind turbine blades comprise one or more internally arranged down conductors and a number of lightning receptors arranged on the external surface of the blade.

It is a well-known problem of such systems, that lightning strikes do not only attach to the wind turbine blade in the intended positions, i.e. on the external attachment points, the so-called lightning receptors, but can also strike the internal conductive parts of the lightning protection system directly through the structure of the blade. Such incidents can cause severe structural damage to the wind turbine blade due to the large amounts of energy typically released in relation to lightning impacts.

Since the size of the wind turbines increases the size of the wind turbine blades increase as well. Hence the structural design of the wind turbine blades is being more and more important since it is always a desire to design the wind turbine blades as light as possible without jeopardizing the strength of wind turbine blade. Thus, it has been even more important to protect the wind turbine blade in the entire length for structural damages caused by lightning impacts.

It is an object of the present invention to wholly or partly overcome the above disadvantages and drawbacks of the prior art. More specifically, it is an object to provide an improved lightning protection system for wind turbine blades having structural element being a spar or beam made of fibre reinforced polymer (FRP).

SUMMARY OF THE INVENTION

The above objects, together with numerous other objects, advantages and features, which will become evident from the below description, are accomplished by a solution in accordance with the present invention by a lightning protection system for a wind turbine blade, the wind turbine blade comprises a root end and a tip end and a longitudinal axis, a pressure side and a suction side, the pressure side and the suction side are the outer faces of the wind turbine blade, and a structural element extending along the longitudinal axis, the structural element is a spar or beam made of fibre reinforced polymer (FRP), the lightning protection system comprising:

a first down conductor extending from the tip end to a tip connection block arranged at a predetermined distance from the tip end, the first down conductor being electrically connected with the tip connection block, a second down conductor extending from the tip connection block between and along the structural element and the pressure side towards a root connection block arranged at the root end, a third down conductor extending from the tip connection block between and along the structural element and the suction side towards the root connection block, the second down conductor comprises a first sheet and the third down conductor comprises a second sheet, the first sheet and the second sheet are fully or partly made of a conductive material, the first sheet and the second sheet comprise a plurality of conductive connection points, the conductive connection points are arranged in the vicinity of the tip connection block and the root connection block and are electrically connected with the tip connector block and the root connector block, respectively.

Accordingly, the tip connection block serves as the interface between the first down conductor extending from the tip of the wind turbine blade to the two sheets in each blade shell acting as down conductors from the tip of the FRP sparcaps. In addition, bonding or equipotentialization between pressure side and suction side down conductors is performed in one unit. At the same time, the second and third down conductors may act as a receptor base for strikes attaching to the tip of the sheets. The part is carefully designed to handle the full lightning current and avoid interception failures due to its insulating casting.

Furthermore, the structural element may be a spar or beam made of carbon fibre reinforced polymer (CFRP) being electrically conductive.

The predetermined distance may be 5 to 25 meters from the tip end of the wind turbine blade depending on the overall length of the wind turbine blade.

Also, the first expanded foil or first mesh and the second expanded foil or second mesh may be symmetrical arranged on opposite sides in relation to the structural element and being substantially equal in size.

Furthermore, the conductive connection points may be made of metal or other conductive materials, or a combination thereof.

Additionally, the metal may be tin, aluminium, copper, brass, silver, gold, or any alloys thereof.

Moreover, the conductive connection point may comprise a first layer and a second layer.

The first layer may be made of a first material and the second layer may be made of a second material. The first material is different from the second material.

Also, the conductive connection points may be directly or indirectly connected with the connection blocks.

In an embodiment, each conductive connection point may have a geometry exhibiting an outer and closed curvature with a minimum radius of curvature of between 3 mm to 200 mm, preferably between 5 mm to 100 mm.

Furthermore, the conductive connection points may have a semi major axis and semi minor axis.

The semi major axis and semi minor axis may be equal providing a circular outer periphery.

Moreover, the semi major axis and semi minor axis may be different providing an oval or elliptic outer periphery.

Additionally, the semi major axis may be oriented in a predetermined angle in relation to the longitudinal axis of the wind turbine blade.

The predetermined angle may be between 0 degrees and 90 degrees.

Also, the conductive connection points may be partly or fully circular or oval.

In addition, the connection points may have an asymmetrically shape.

In addition, the outer periphery of the conductive connection points may be defined by curved lines and straight lines.

Furthermore, the conductive connection points may be without any pointed corners.

Moreover, the conductive connection points may have a thickness, the thickness is larger than 0.5 mm, preferably larger than 1.0 mm.

Also, the thickness of the conductive connection point may extend in both directions with respect to a thickness of the sheets.

In addition, the conductive connection points may be mechanically connected with the sheet.

The conductive connection points may be adhered to the sheet by a conductive adhesive.

Furthermore, a receptor bolt may be screwed through the conductive connection point and into the connection block.

Moreover, a thread may be provided in the conductive connection point.

Also, a receptor bolt may be terminated in the conductive connection point.

Additionally, a side receptor may be connected to a conductive connection point.

A plurality of intermediate conductive connection points may be arranged opposite the structural element at a predetermined intermediate distance from the tip connection block.

Moreover, the intermediate conductive connection points may be connected with the structural element.

Furthermore, the predetermined intermediate distance may be less than 1500 mm, preferably between 1500 mm to 500 mm, more preferably between 500 mm to 100 mm, most preferably between 100 mm to 10 mm.

Also, the conductive connection point may be made by melting material so that the melted material in a liquid state is connected with the sheet thereby providing a mechanical and electric conductive connection between the conductive connection point and the sheet when the material hardens.

The melting of material may be performed by electrical induction heating or electrical resistive heating.

In addition, the conductive connection point may be made by spraying melted metal onto the sheet followed by soldering.

The conductive connection point may comprise at least two discs, the two discs being arranged on opposite sides of the sheet and subsequently mechanical fasten each disc to each other.

Furthermore, the conductive connection point may comprise at least two discs, the two discs being arranged on opposite sides of the sheet and subsequently being pressed together around the sheet by plastic deformation.

Also, the conductive connection point may comprise at least two discs, the two discs being arranged on opposite sides of the sheet and subsequently being spot welded together.

The conductive connection point may comprise at least two discs, the two discs being arranged on opposite sides of the sheet and subsequently being pulse-melted together.

Moreover, the conductive connection point comprises at least two discs, the two discs being arranged on opposite sides of the sheet and subsequently being glued together by a conductive adhesive.

In addition, the conductive connection point has an edge or outer periphery, a current density at the edge or outer periphery may not be greater than 1500 A/mm.

Advantageously, the first sheet and the second sheet are expanded foils or meshes.

The conductive material of the first expanded foil or first mesh and second expanded foil or second mesh may be metal such as aluminium, copper, steel or associated alloys.

Also, the conductive material of the sheet or mesh may be non-metallic such as a composite or fibres.

The first expanded foil or first mesh may be arranged so as it at least fully cover a first side of the structural element facing the pressure side, and the second expanded foil or second mesh may be arranged so as it at least fully cover a second side of the structural element facing the suction side.

In addition, a length of the first expanded foil or first mesh and the second expanded foil or second mesh may be equal to or longer than a length of the structural element.

Furthermore, the first expanded foil or first mesh may have a first area and the second expanded foil or second mesh has a second area, the first area and the second area are substantially equal.

The expanded foil may be made as a monolithic whole.

Also, the mesh may be provided by weaving conductive threads.

The mesh may also be provided by non-woven conductive threads.

Furthermore, the tip connection block may electrically connect the first down conductor with the first expanded foil or first mesh and the second expanded foil or second mesh, respectively, via the conductive connection points.

Moreover, the tip connector block may comprise at least a first receptor base and at least a second receptor base, the first receptor base is configured to connect the conductive connection point of the first expanded foil to the tip connector block and the second receptor base is configured to connect the conductive connection point of the second expanded foil to the tip connector block.

Additionally, a receptor bolt may be screwed through the conductive connection point and into the receptor base.

Moreover, the tip connector block may comprise at least a first pair of receptor bases and at least a second pair of receptor bases, the first pair is configured to connect the conductive connection points of the first expanded foil to the tip connector block and the second pair is configured to connect the conductive connection points of the second expanded foil to the tip connector block.

Furthermore, an equal numbers of receptor bases may be arranged for connecting the first expanded foil or first mesh and the second expanded foil or second mesh to the tip connection block.

Also, the tip connection block may be configured to avoid interception failures by ensuring that a level of insulation is sufficient.

Moreover, the root connector block may be configured to electrically connect the first expanded foil and second expanded foil with a single root down conductor.

The root connector block may be Y-formed.

Also, a first intermediate connection block may be arranged between the first expanded foil and the root connection block, the first intermediate connection block electrically connects the first expanded foil with the root connection block, and a second intermediate connection block is arranged between the second expanded foil and the root connection block, the second intermediate connection block electrically connects the second expanded foil with the root connection block.

Each intermediate connection block may comprises at least a first receptor base and at least a second receptor base, the first receptor base is configured to connect the connection point of the first expanded foil to the intermediate connection block and the second receptor base is configured to connect the connection point of the second expanded foil to the intermediate connection block.

Also, each intermediate connection block may comprise at least a pair of receptor bases, the pair of receptor bases is configured to connect the conductive connection points of the expanded foils to the intermediate connector blocks.

In addition, a receptor bolt may be screwed through the conductive connection points and into the receptor base of the intermediate connection blocks.

Furthermore, a first cable may be arranged between the first intermediate connection block and the root connection block and a second cable is arranged between the second intermediate connection block and the root connection block. The first cable and the second cable function as a down conductor.

Moreover, the structural element may be conductive and manufactured by pultruded parts. The pultruded parts may be made in a dry fabric layup and a vacuum assisted resin infusion process, using pre-impregnated glasfiber sheets.

In addition, the structural elements may for instance be manufactured by assembling and stacking of several conductive pultruded profiles, infusion and heating into a complete structural element;

a dry fabric layup followed by a vacuum assisted resin infusion process and heating; or layup of pre-impregnated fibre plies followed by vacuum and heating.

The present invention also relates to a wind turbine blade comprising a root end and a tip end, and a longitudinal axis, a pressure side and a suction side, the pressure side and the suction side are the outer faces of the wind turbine blade, and a structural element extending along the longitudinal axis, the structural element is a spar or beam made of carbon fibre reinforced polymer (CFRP) being electrically conductive, and a lightning protection system as described above.

The present invention also relates to a wind turbine having one or more wind turbine blades with a lightning protection system as described above.

The present invention additionally relates to a method for providing a conductive connection point of the lightning protection system to a sheet such as an expanded foil or mesh, comprising melting a conductive material applying the melted conductive material in a liquid state for surrounding the expanded foil or mesh, allowing the melted material to harden for providing a mechanical and electric conductive connection between the connection point and the expanded foil or mesh.

The step of melting the material may be performed by electrical induction heating or electrical resistive heating.

The step of applying a melted connective material is performed by pouring.

The present invention also relates to a method for providing a conductive connection point of the lightning protection system to a sheet such as an expanded foil or mesh, comprising

6 providing a moulded conductive material, applying the moulded conductive material onto the expanded foil or mesh, soldering the moulded conductive material for providing a mechanical and electric conductive connection between the connection point and the expanded foil or mesh.

The present invention furthermore relates to a method for providing a conductive connection point of the lightning protection system to a sheet such as an expanded foil or mesh comprising providing at least two discs being made of conductive material, arranging the two discs on opposite sides of the expanded foil or mesh, fastening the discs to each other with the expanded foil or mesh between them for providing an electric conductive connection between them.

In addition, the discs may be fastened to each other by a mechanical connection.

Also, the discs may be fastened to each other by pressing the two discs together around the expanded foil or mesh by plastic deformation.

Furthermore, the discs may be fastened to each other by spot welding.

Moreover, the discs may be fastened to each other by pulse-melting.

Additionally, the discs may be fastened to each other by applying a conductive adhesive between the discs and maintaining the discs in position until the adhesive is cured.

BRIEF DESCRIPTION OF THE DRAWINGS

The invention and its many advantages will be described in more detail below with reference to the accompanying schematic drawings, which for the purpose of illustration show some non-limiting embodiments and in which FIGS. 26 to 29 show different embodiments of a side receptor.

All the figures are highly schematic and not necessarily to scale, and they show only those parts which are necessary in order to elucidate the invention, other parts being omitted or merely suggested.

DETAILED DESCRIPTION

Figure 1:
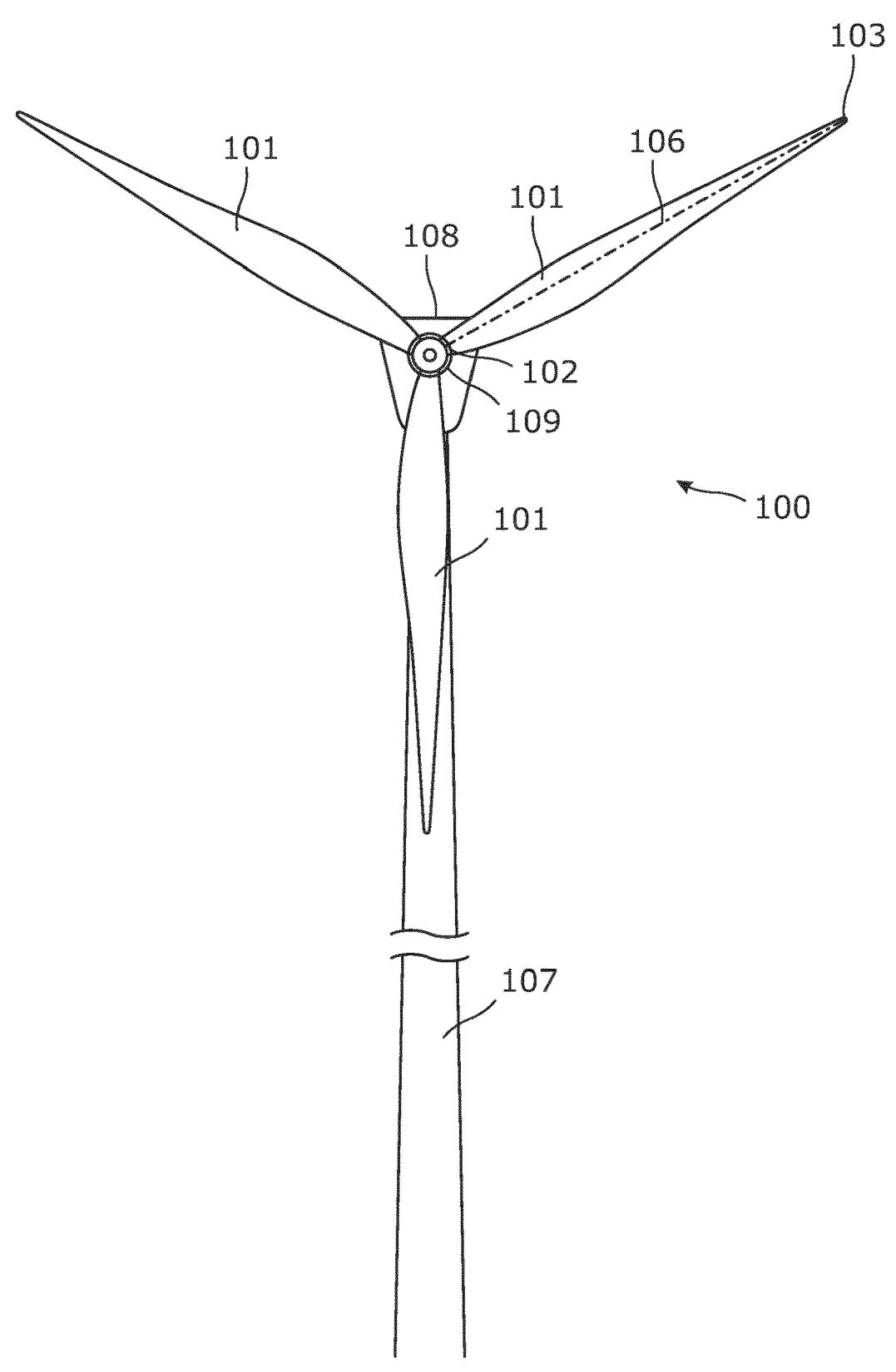
FIG. 1 shows a wind turbine having three wind turbine blades.

FIG. 1 shows a wind turbine 100 having a tower 107, a nacelle 108 and three wind turbine blades 101. Each wind turbine blade 101 has a root end 102 connected to a hub 109 and a tip end 103. The wind turbine blade 101 has a longitudinal axis 106 extending from the root end 102 to the tip end 103.

Figure 2:
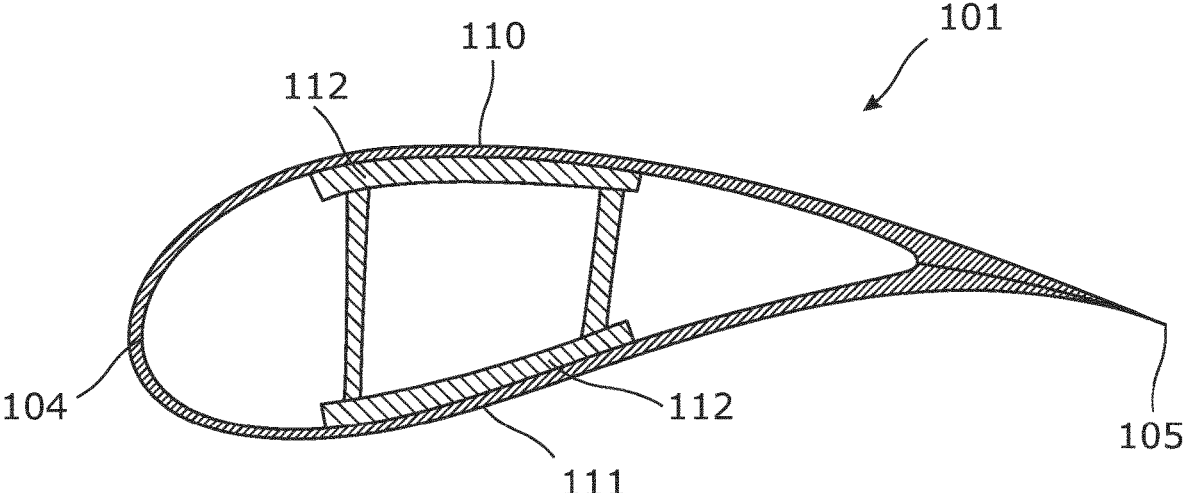
FIG. 2 shows a cross-section view through a wind turbine bade.

In FIG. 2 a cross-sectional view of wind turbine blade 101 is shown. The wind turbine blade 101 has a pressure side 111 and a suction side 110, the pressure side 111 and the suction side 110 are the outer faces of the wind turbine blade 101. The wind turbine blade 101 has also a leading edge 104 and a trailing edge 105. The wind turbine blade 101 has a structural element 112 extending along the longitudinal axis, the structural element 112 is a spar or beam made of carbon fibre reinforced polymer (CFRP) being electrically conductive. The CFRP spar or beam enhances the strength of the wind turbine blade 101. The present embodiment shows that the structural elements 112 are arranged in the shells of the wind turbine blade 101. The CFRP elements may be connected via webs being made for instance as a sandwich structure of GFRP and core materials (PVC foam or balsa wood).

The present invention is especially directed to enhancing the lightning protection of a wind turbine blade 101 having a structural element being made of CFRP and thereby being electrically conductive.

Figure 3:
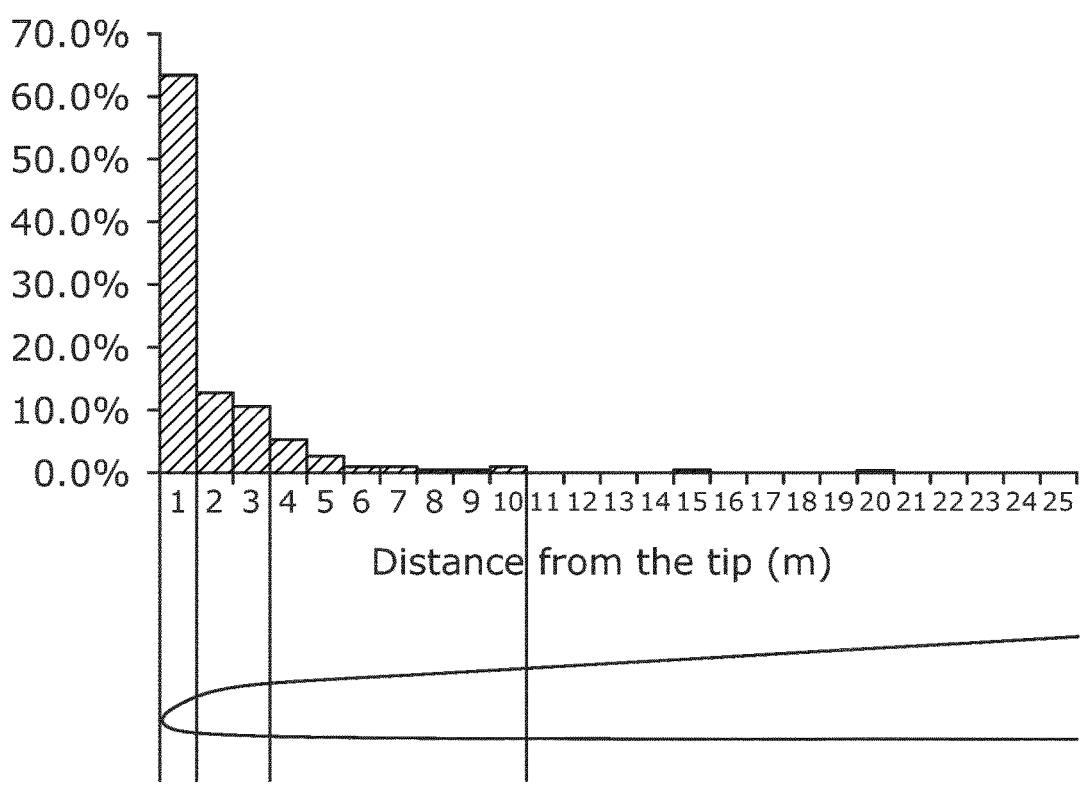
FIGS. 3 to 6 show schematically lightning impact and zones of the wind turbine blade being exerted for lightning strikes.
Figure 4:
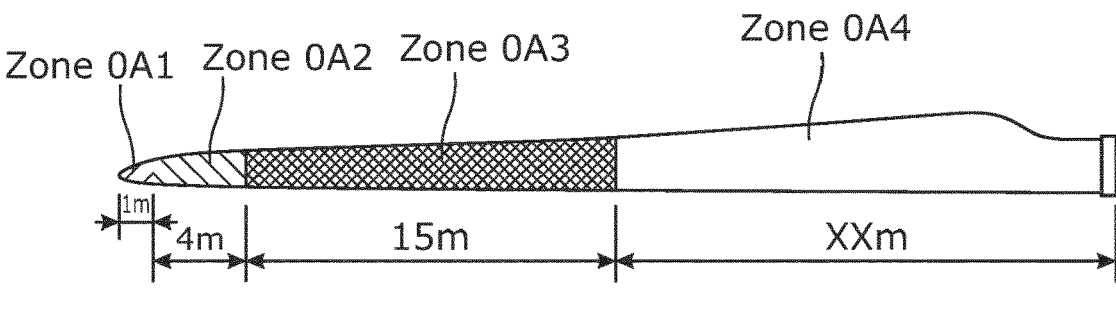

For a numerous of years field inspections have consistently demonstrated how the blade tips are the most exposed parts of the wind turbines, see FIG. 3, corroborating the numerical models describing lightning attachment process. The results have led to the development of a zoning concept for wind turbine blades, describing which parts of the blades are most exposed and to which lightning current amplitudes.

The numerical simulations were conducted for generic blades of 40-80 m lengths, investigating the distribution of strikes attaching to the turbines at different current amplitudes. The results showed clearly that for downward initiated strikes the majority of all strikes attach to the blade tips, and that for lower amplitude strikes, the attachment can move inboard on the blade and attach to other and less exposed parts of the wind turbine (hub, nacelle, tower, etc.).

The zoning concept may be used to describe the possible strike amplitudes to different regions on the blade. In some interpretations of the LPL1 requirements in the IEC 61400-24 standard all strikes with amplitudes between for instance 3 kA and 200 kA must be safely intercepted and conducted towards ground, whereas damages are tolerated for strikes outside these extremities. In practice, this would mean that since strikes may occur to the inboard sections of the blade (although with a very low probability), the blade must be able to withstand them so that unscheduled stop of operation is avoided. In practice the distribution of the amplitudes follows a normal distribution, meaning that the "little" currents are able to sneak inward, and the lightning protection system is designed to handle this.

Moreover, if the probabilities of having such small amplitude strikes to the blades are accounted for, by considering the probability density functions described in the lightning protection standard, one can come to the conclusion that protection according to strikes of such low amplitudes is unnecessary, because these only occur very rarely.

The design of lightning protection system should rather focus on the protection of the more exposed parts of the blade by ensuring the attachment to the intended air terminations at the tip region.

Figure 5:
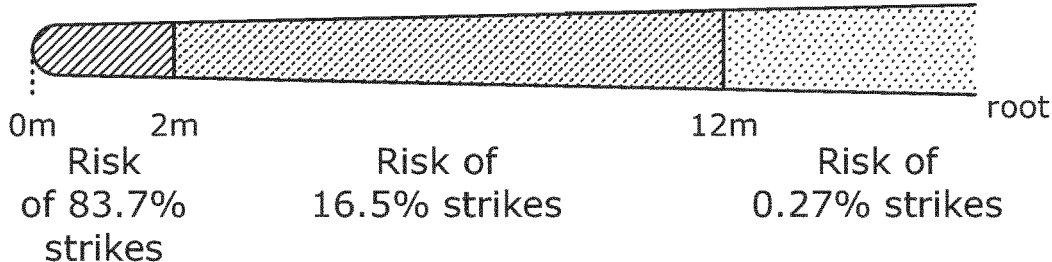
Figure 6:
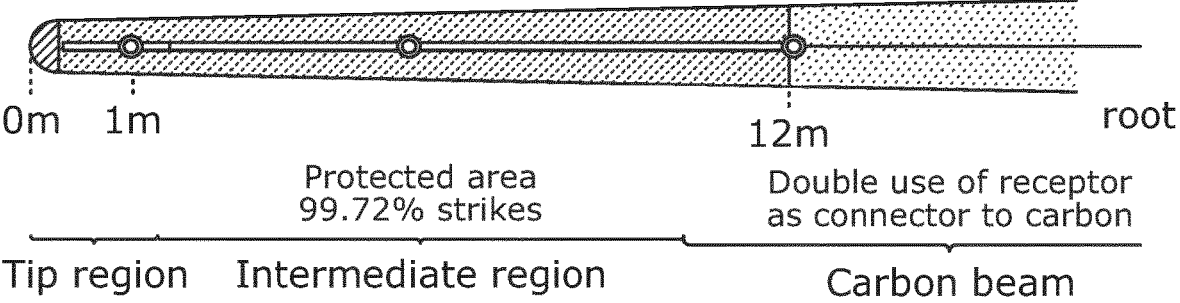

As seen in FIGS. 3, 5 and 6 over 75% of damages are experienced on the first couple of meters from the tip end wherefore these zones of the blades are vital to protect. Even though the occurrence strikes are considerably lower 10 meters from the tip end the CFRP spar or beam is often arranged along the longitudinal axis from this point. Hence it is still very important to ensure proper lightning protection of the CFRP spar or beam.

Figure 7:
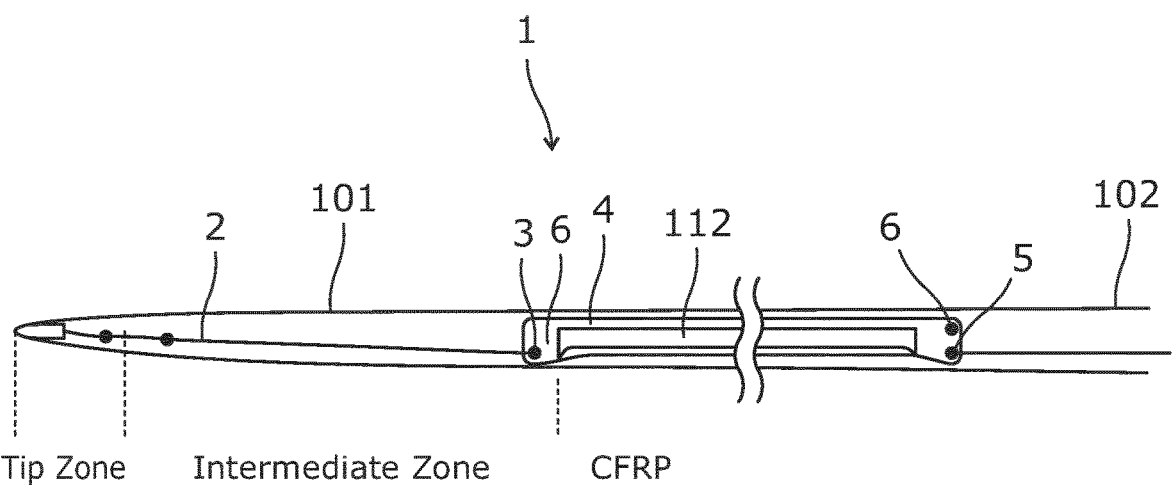
FIG. 7 shows schematically a lightning protection system according to the present invention.

The lightning protection system 1 according to the present invention is shown schematically in FIG. 7. The lightning protection system 1 comprises a first down conductor 2 extending from the tip end 103 to a tip connection block 3 arranged at a predetermined distance from the tip end, the first down conductor 2 being electrically connected with the tip connection block 3.

Furthermore, a second down conductor 4 extending from the tip connection block 3 between and along the structural element 112 and the pressure side towards a root connection block 5 arranged at the root end 102.

In addition, a third down conductor (not shown in FIG. 7) extending from the tip connection block between and along the structural element and the suction side towards the root connection block.

The second down conductor comprises a first sheet and the third down conductor comprises a second sheet, the first sheet and the second sheet are made of a conductive material for functioning as down conductors.

The first sheet and the second sheet comprise a plurality of conductive connection points 6, the conductive connection points 6 are arranged in the vicinity of the tip connection block 3 and the root connection block 5 and are electrically connected with the tip connector block and the root connector block, respectively.

Hereby the tip connection block 3 serve as the interface between the first down conductor 2 from the tip of the wind turbine blade 101, to the first sheet and the second sheet in each blade shell acting as down conductors from a tip part of the CFRP spar or beam. In addition, bonding or equipotentialization between pressure side down conductor, i.e. first sheet, and suction side down conductor, i.e. second sheet, is performed in one unit. At the same time, the second down conductor and third down conductor act as a receptor base for strikes attaching to the tip of the sheets. The part is carefully designed to handle the full lightning current and avoid interception failures due to its insulating casting.

Figure 8:
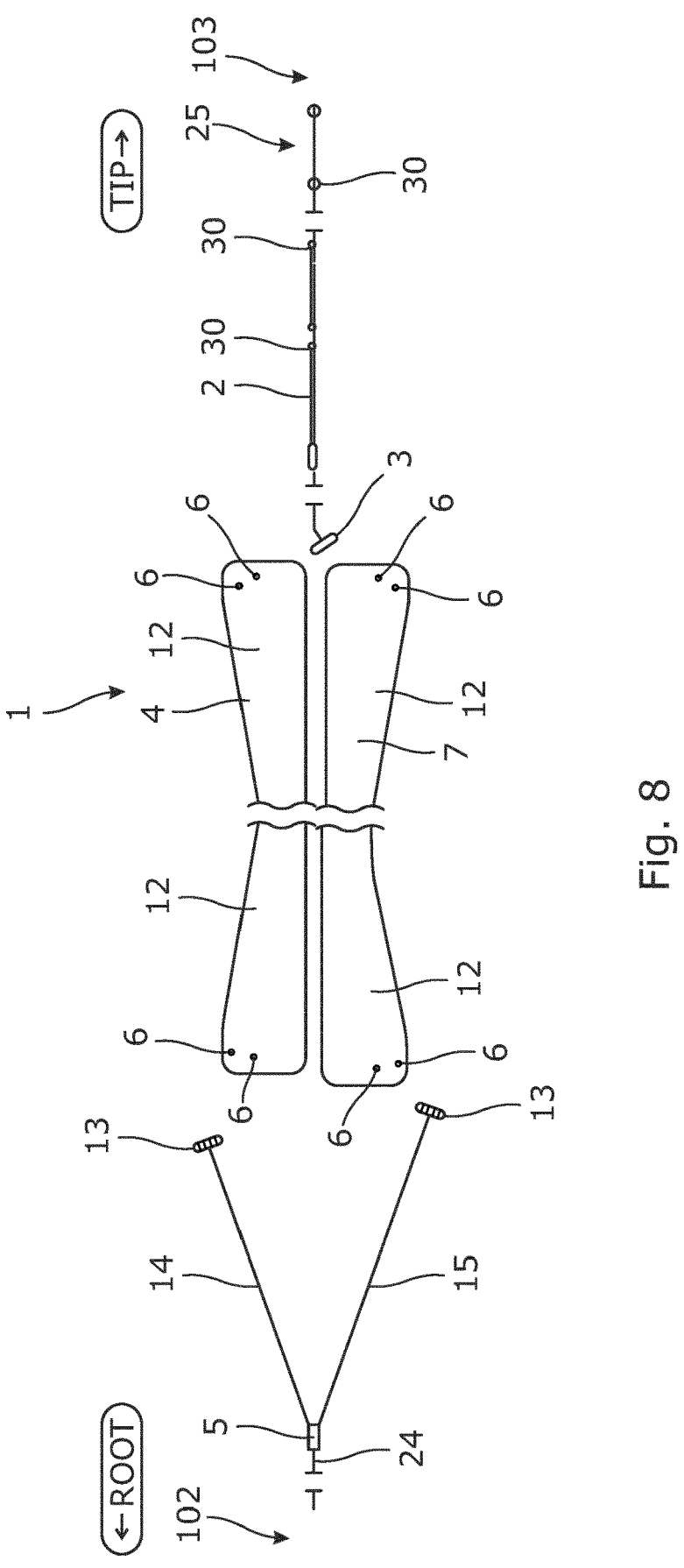
FIG. 8 shows another lightning protection system according to the invention.

In FIG. 8 an embodiment of a lightning protection system 1 according to the invention is shown. The lightning protection system 1 comprises a first down conductor 2 extending from the tip end 103 to a tip connection block 3 arranged at a predetermined distance from the tip end, the first down conductor 2 being electrically connected with the tip connection block 3.

The second down conductor 4 extending from the tip connection block 3 between and along the structural element (not shown in FIG. 8) and the pressure side towards a root connection block 5 arranged at the root end 102. The third down conductor 7 extending from the tip connection block 3 between and along the structural element and the suction side towards the root connection block 102.

The second down conductor 4 comprises a first sheet 4 and the third down conductor 7 comprises a second sheet 7, the first sheet 4 and the second sheet 7 are made of a conductive material for functioning as down conductors.

As seen in FIG. 8 the first sheet 4 and the second sheet 7 comprise a plurality of conductive connection points 6, the conductive connection points 6 are arranged in the vicinity of the tip connection block 3 and the root connection block 5 and are electrically connected with the tip connector block 3 and the root connector block 5, respectively.

In the present embodiment two conductive connection points 6 are arranged for electrically connecting the first sheet 4 with the tip connection block 3, and two conductive connection points 6 are arranged for electrically connecting the second sheet 7 with the tip connection block 3. In other embodiments only one conductive connection point connects the first sheet to the tip connection block and one conductive connection point connects the second sheet to the tip connection block. In addition, a plurality of connection points may connect the first sheet to the tip connection block and a plurality of connection points may connect the second sheet to the tip connection block. Advantageously, the number of conductive connection points connecting the first sheet with the tip connection block is identical to the number of connection points connecting the second sheet to the tip connection block. The same applies in relation to the root connection block.

As indicated in FIG. 8, the first sheet 4 and the second sheet 7 are symmetrical arranged on opposite sides in relation to the structural element and being substantially equal in size. Hereby is obtained that due to Faraday cage-like geometry the CFRP structural element is protected and the risk of high current density in the CFRP structural element and the risk of high voltage differences and internal flashover between parts of the CFRP structural elements are avoided.

The conductive connection points are preferably made of metal or other conductive materials, or a combination thereof. The metal may be tin, aluminum, copper, brass, silver, gold or any alloys thereof.

Also, the conductive connection point may comprise a first layer and a second layer. The first layer may be made of a first material and the second layer is made of a second material. The first material may be different from the second material.

Figures 9, 10, 11, 12:
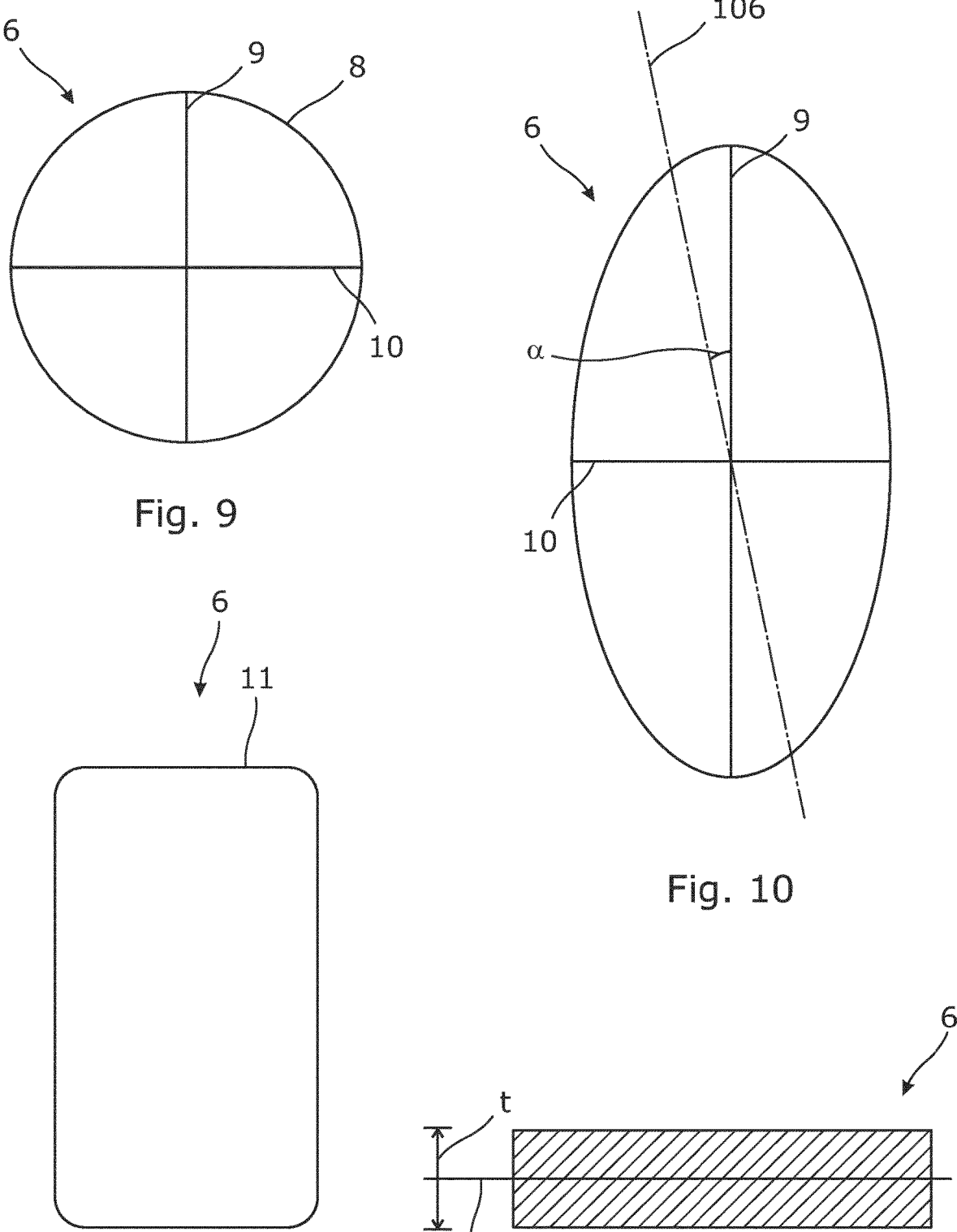
FIGS. 9 to 12 show different shapes of a conductive connection point.

In FIG. 9 an embodiment of a conductive connection point 6 is shown. Each connection point 6 may have a geometry exhibiting an outer and closed curvature 8 with a minimum radius of curvature of between 3 mm to 200 mm, preferably between 5 mm to 100 mm.

In addition, the connection point 6 has a semi major axis 9 and semi minor axis 10 as shown in FIG. 9. When the semi major axis 9 and semi minor axis 10 are equal in length a circular outer periphery of the conductive connection point is provided as shown in FIG. 9.

When the semi major axis 9 and semi minor axis 10 are different an oval or elliptic outer periphery of the conductive connection point 6 is provided as shown in FIG. 10. In addition, the semi major axis 9 may be oriented in a predetermined angle α in relation to the longitudinal axis 106 of the wind turbine blade. The predetermined angle α may be between 0 degrees and 90 degrees.

Hence, the connection points 6 may be partly or fully circular or oval.

In addition, the connection points may have an asymmetrically shape.

Also, the outer periphery 11 of the connection points 6 may be defined by curved lines and straight lines as shown in FIG. 11.

It is presently preferred that the connection points 6 are without any pointed corners.

As seen in FIG. 12, the connection points 6 may have a thickness t, the thickness t is larger than 0.5 mm, preferably larger than 1.0 mm. The thickness t of the connection point 6 may extend in both directions with respect to a thickness of the sheets.

The first sheet 4 and second sheet 7 are made of conductive material. The conductive material may be metal such as aluminum, copper, steel or associated alloys.

In other embodiments the conductive material is non-metallic such as a composite or fibers.

For minimizing the weight of the first sheet and the second sheet they may be provided as expanded foils or meshes.

The first expanded foil or first mesh may be arranged so as it at least fully cover a first side of the structural element facing the pressure side, and the second expanded foil or second mesh is arranged so as it at least fully cover a second side of the structural element facing the suction side.

In addition, a length of the first expanded foil or first mesh and the second expanded foil or second mesh may be equal to or longer than a length of the structural element.

Moreover, the first expanded foil or first mesh may have a first area and the second expanded foil or second mesh may have a second area, the first area and the second area are substantially equal.

Furthermore, the expanded foil may be made as a monolithic whole.

The mesh may be provided by weaving conductive threads.

In another embodiment, the mesh may be provided by non-woven conductive threads.

The conductive connection point 6 may be provided to a sheet, such as an expanded foil or mesh by melting a conductive material, applying the melted conductive material in a liquid state for surrounding the expanded foil or mesh, allowing the melted material to harden for providing a mechanical and electric conductive connection between the conductive connection point and the expanded foil or mesh.

The melting of material may be performed by electrical induction heating or electrical resistive heating.

The melted connective material may be applied by pouring it into a mould arranged in connection with the expanded foil or mesh. The mould defining the outer periphery of the conductive connection point. The conductive material may be a metal such as tin.

The conductive connection point 6 may also be provided to a sheet such as an expanded foil or mesh by providing a moulded conductive material, applying the moulded conductive material onto the expanded foil or mesh, soldering the moulded conductive material for providing a mechanical and electric conductive connection between the connection point and the expanded foil or mesh.

The conductive connection point 6 may additionally be provided to a sheet such as an expanded foil or mesh by providing at least two discs being made of conductive material, arranging the two discs on opposite sides of the expanded foil or mesh, fastening the discs to each other with the expanded foil or mesh between them for providing an electric conductive connection between them.

The discs may be fastened to each other by a mechanical connection.

In another embodiment, the discs may be fastened to each other by pressing the two discs together around the expanded foil or mesh by plastic deformation.

Furthermore, the discs may be fastened to each other by spot welding or soldering.

Also, the discs may be fastened to each other by pulse-melting.

In addition, the discs may be fastened to each other by applying a conductive adhesive between the discs and maintaining the discs in position until the adhesive is cured.

Figure 13:
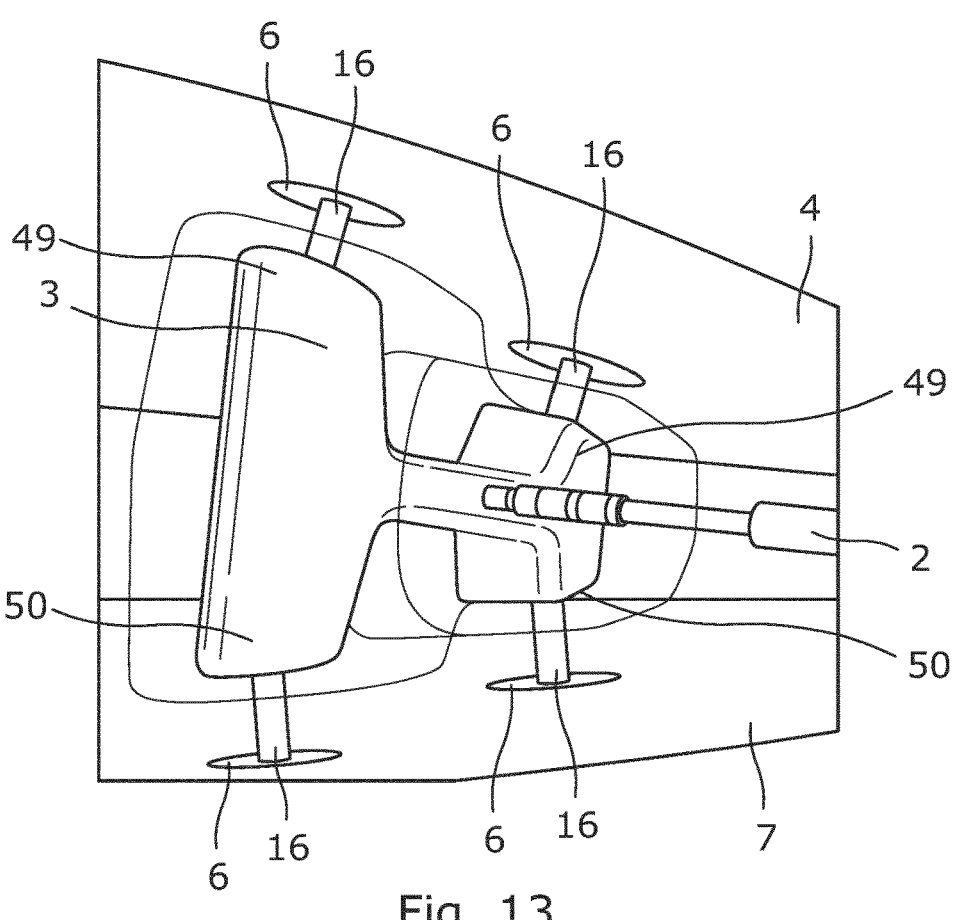
FIGS. 13 to 14 show the tip connection block arranged between sheets.
Figure 14:
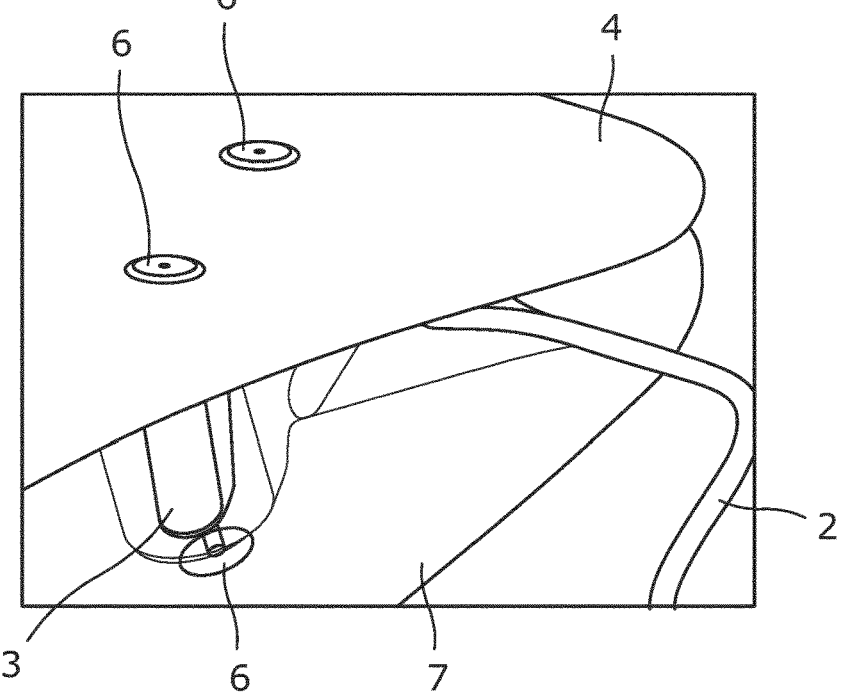

In FIGS. 13 and 14 an embodiment of the tip connection block 3 connected to the first sheet 4 and the second sheet 7 are shown. The conductive connection points 6 have been arranged at predetermined positions on the first sheet 4 and second sheet, respectively, and the tip connection block 3 is arranged so that it is possible to electrically connect the conductive connection points 6 to the tip connection block 3. In the present embodiment a connection bolt 16 has been screwed trough the conductive connection point 6 and into the tip connection block 3. Hereby is obtained that the first down conductor 2 is electrically connected with the first sheet 4, i.e. the second down conductor, and the second sheet 7, i.e. the third down conductor so that lightning current from a lightning strike may be led from the first down conductor 2 through the tip connection block 3 and into the first sheet 4 and second sheet 7 via the conductive connection points 6 and thereby down towards the root end of the wind turbine blade.

The tip connector block 3 comprise at least a first block receptor base 49 and at least a second block receptor base 50, the first block receptor base 49 is configured to connect the conductive connection point 6 of the first sheet 4 to the tip connector block 3 and the second block receptor base 50 is configured to connect the connection point 6 of the second sheet 7 to the tip connector block 3. In the embodiment shown in FIGS. 13 and 14 the tip connection block 3 has two first block receptor bases 49 and two second block receptor bases 50.

As mentioned above a connection bolt 16 or a receptor bolt is screwed through the connection point 6 and into the block receptor base 49, 50. Hence, in this embodiment the connection points are directly connected with the connection block.

The tip connector block may comprise at least a first pair of block receptor bases and at least a second pair of block receptor bases, the first pair is configured to connect the connection points of the first expanded foil to the tip connector block and the second pair is configured to connect the connection points of the second expanded foil to the tip connector block.

An equal numbers of block receptor bases may be arranged for connecting the first sheet and the second sheet to the tip connection block.

Figure 15:
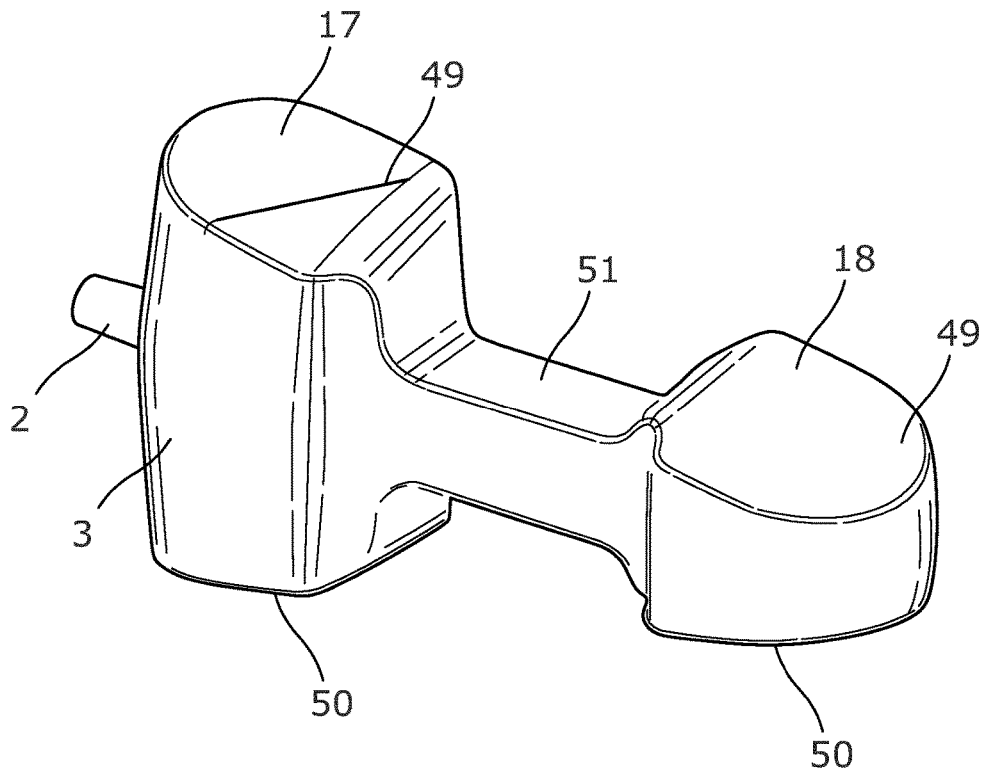
FIGS. 15-16 show an embodiment of a tip connection block.
Figure 16:
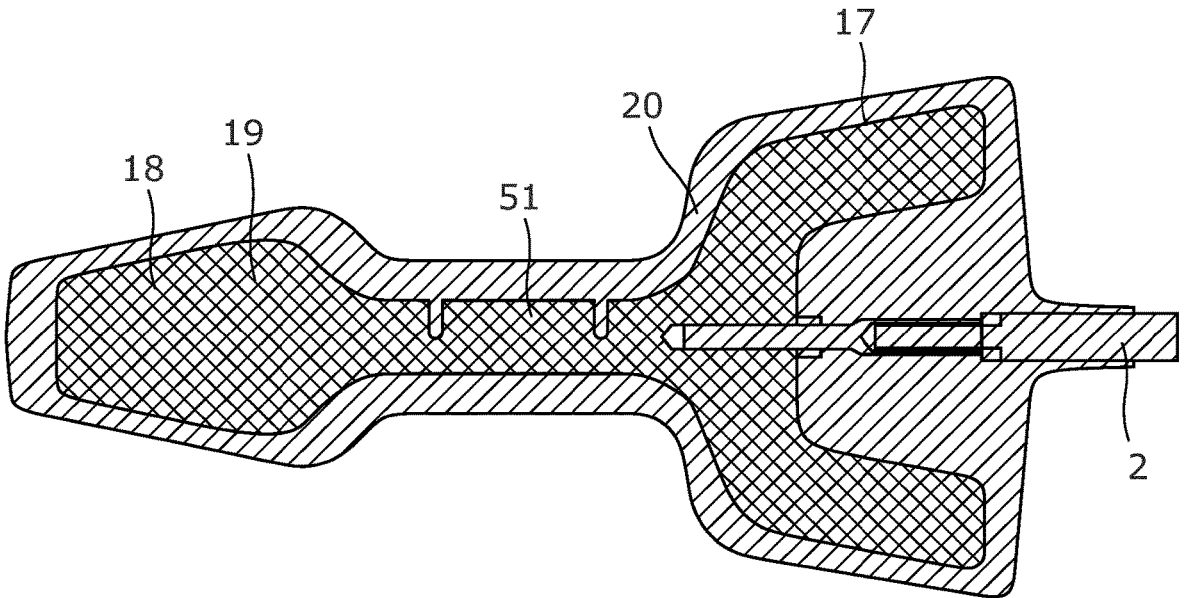

In FIGS. 15 and 16 another embodiment of a tip connection block 3 are shown. The tip connection block 3 is in the present embodiment designed with a first part 17 and a second part 18 connected via an intermediate part 51. The first part 17 is larger in size than the second part 18 so that it may be arranged within the wind turbine blade having the first part 17 arranged closer to the leading edge than the second part 18. Both the first part 17 and the second part 18 comprise on one side the first block receptor base 49 and on an opposite side the second block receptor base 50.

In FIG. 16 a cross-sectional view of the tip connection block 3 of FIG. 15 is shown. The tip connection block 3 has a core 19 of conductive material extending from the first part 17 via the intermediate part 51 to the second part 18 so that all parts are electrically connected. The entire core 19 is covered by an isolation layer 20. The first down conductor 2 is in this embodiment connected with the core of the second part 18. In addition, it is important that the connection bolts are screwed trough the conductive connection points and into the conductive core of the tip connection block 3 for providing electrically connection. The conductive material of the core 19 may be metal such as aluminum or brass.

The design and shape of the tip connection block 3 may vary due to different wind turbine blade design and the positions within the blade it shall be positioned. However, the tip connection block is configured to avoid interception failures by ensuring that a level of insulation is sufficient. Furthermore, the tip connection block is configured to carry a lightning current sufficiently.

Before screwing the connection bolt or receptor bolt through the conductive connection point a thread is provided in the conductive connection point.

Also, a receptor bolt is terminated in the connection point and a side receptor may be connected to a connection point if it is necessary to provide the lightning protection system with side receptors opposite the first sheet and the second sheet.

Returning to FIG. 8, the lightning protection system 1 also comprises tip unit 25 and a plurality of side receptors 30 arranged between the tip end 103 and the tip connection block 3. The tip unit 25 and the side receptors 30 are connected via the first down conductor 2. An embodiment of the tip unit will be described further below in connection with FIGS. 22 to 23.

The space between the blade shell parts at the tip end is rather limited compared to the space at the root end. Hence, the root connection block is often arranged a larger distance from the first sheet 4 and the second sheet 7. In the lightning protection system 1 two intermediate connection blocks 13 are arranged for electrically connecting the conductive connection points of first sheet 4 and second sheet 7, respectively. Each intermediate connection block 13 has a cable 14, 15 electrically connecting the intermediate connection block with the root connection block 5. The root connection block 5 is electrically connected with a single root down conductor 24 being electrically connected to earth through the wind turbine nacelle and tower (not shown).

In addition, the first sheet 4 and the second sheet 7 may have intermediate conductive connection points 12 arranged opposite the structural element. The intermediate conductive connection points closest to the tip end may be arranged at a predetermined distance from the tip connection block 3. The predetermined distance is less than 1500 mm, preferably between 1500 mm to 500 mm, more preferably between 500 mm to 100 mm, most preferably between 100 mm to 10 mm.

Since the structural element of the blade is made of CFRP, directly coupled or induced lightning current from lightning strikes will be led through the structural element. The size of the lightning current in the CFRP beam or spar is minimized by arranging the first sheet 4 and the second sheet 7 outside and opposite the extension of the CFRP spar or beam so that the majority of lightning current will be conducted via the first sheet and the second sheet. The remaining current which still will be running in the CFRP beam or spar has to be controlled for equalizing potential differences in the material and avoiding unintended electrically flashovers between the CFRP beams or spars.

The intermediate connection points 12 are therefore electrically connected with the structural element when necessary, so that a certain current is led from the first sheet and the second sheet over in the CFRP structural element, whereby the potential differences in the material is equalized and the CFRP structural element is not exerted for damaging currents and energies. Hence, the function of the CFRP structural element will be maintained by the lightning protection system 1 according to the present invention.

At the root end of the first sheet 4 and the second sheet 7 intermediate conductive connection points 12 are arranged in electrically connection with the structural element when needed for ensuring that the current running in the structural element is led out in the first sheet 4 and the second sheet 7 via the intermediate conductive connection points 12 and therefrom down to the root connection block 5.

Figure 17:
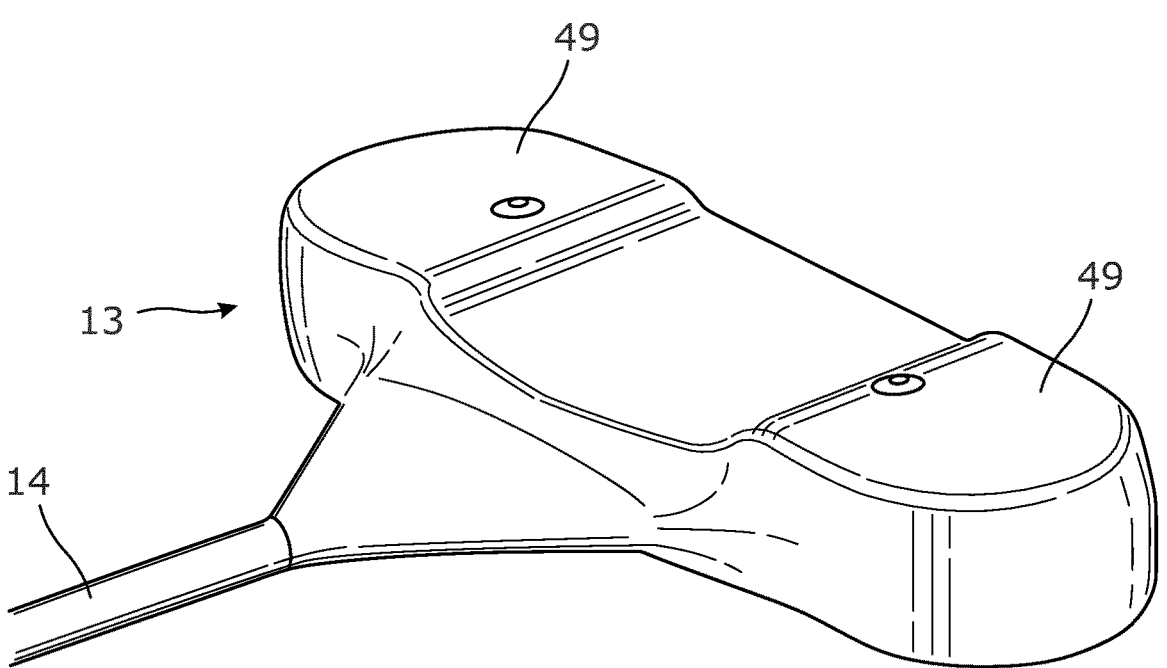
FIGS. 17 to 18 show different embodiments of an intermediate connection block.

In FIG. 17 an embodiment of an intermediate connection block is shown. The intermediate connection block 13 function in the same manner as the tip connection block as described earlier.

However, as mentioned previously the first intermediate connection block is arranged between the first sheet 4 and the root connection block, the first intermediate connection block electrically connects the first sheet with the root connection block, and the second intermediate connection block is arranged between the second sheet and the root connection block, the second intermediate connection block electrically connects the second expanded metal foil with the root connection block.

Each intermediate connection block 13 comprises at least one receptor base 49 configured to connect the conductive connection point of the sheets to the intermediate connection. In the embodiment shown in FIG. 17, the intermediate connection block 13 has two receptor bases 49. In the same manner as with the tip connection block a connection bolt or receptor bolt is screwed through the conductive connection points and into the receptor base 49 of the intermediate connection blocks 13. A first cable 14 is arranged between the first intermediate connection block 13 and the root connection block and a second cable are arranged between the second intermediate connection block and the root connection block.

Figure 18:
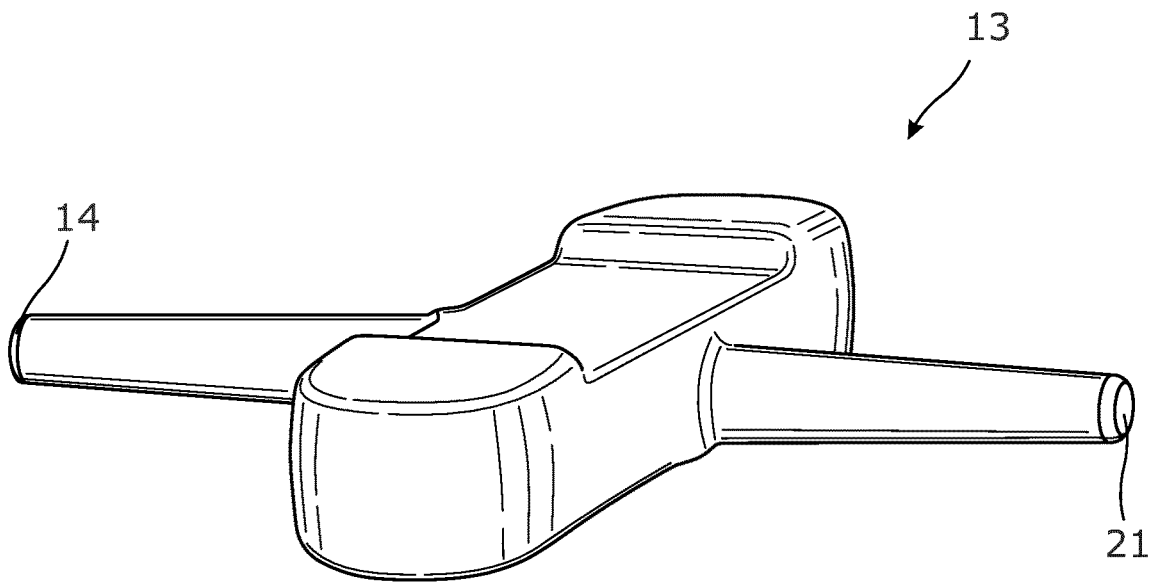

In FIG. 18 another embodiment of an intermediate connection block is shown. This intermediate connection block is very similar to the one shown in FIG. 17, however, the intermediate connection block 13 comprises an intermediate cable 21 electrically connected to the CFRP structural element as shown in FIG. 19.

Figure 19:
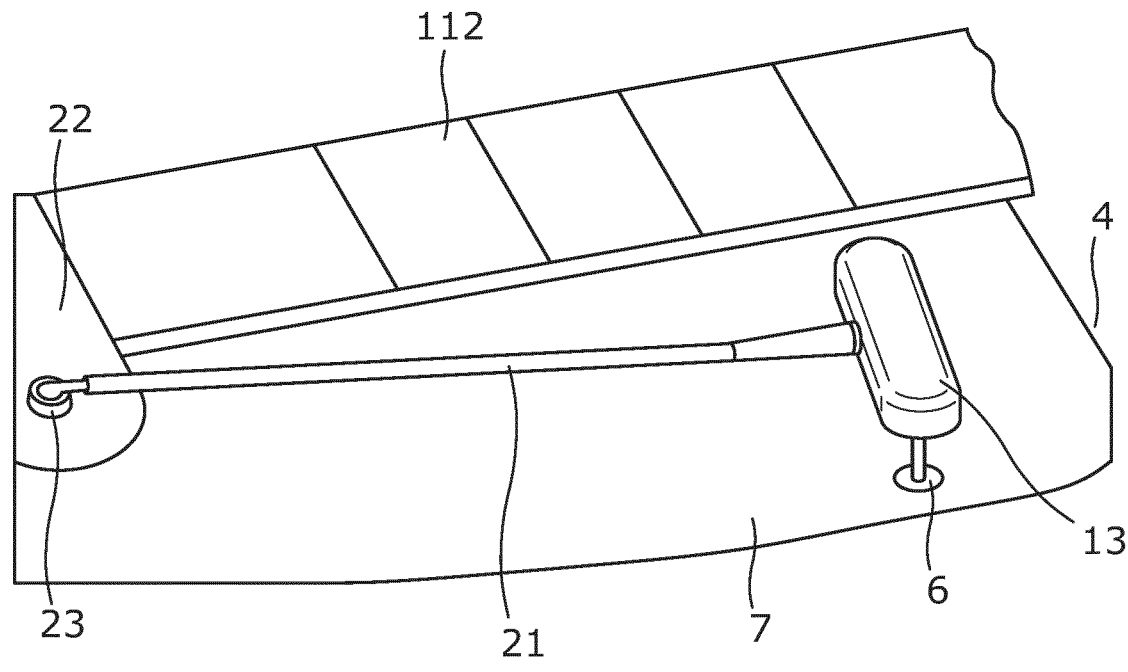
FIG. 19 shows an intermediate connection block being connected to a sheet and a connection patch.

As seen in FIG. 19 a connection patch 22 is electrically connected to the CFRP structural element 112. The connection patch 22 has a cable connector 23 which again is connected with the intermediate cable 21, which in turn is connected with the intermediate connection block 13. Hereby current running in the CFRP structural element 112 may be led to the intermediate connection block 13 in an expedient manner. The intermediate connection block 13 may in same manner as described earlier be connected to the second sheet 7 via conductive connection points 6.

Figure 20:
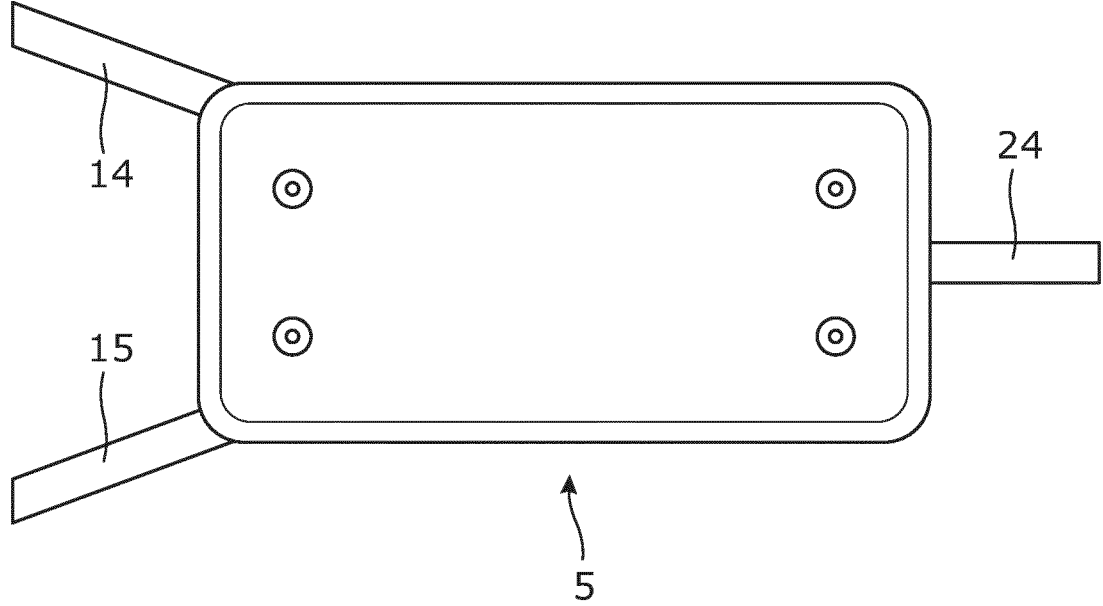
FIGS. 20 to 21 show different embodiments of a root connection block.

In FIG. 20 an embodiment of the root connection block 5 is shown. The root connection block function in the same manner as described above and the lightning current from the first cable 14 and the second cable 15 is interfaced in the root connection block 5 and led into the single root down conductor 24.

Figure 21:
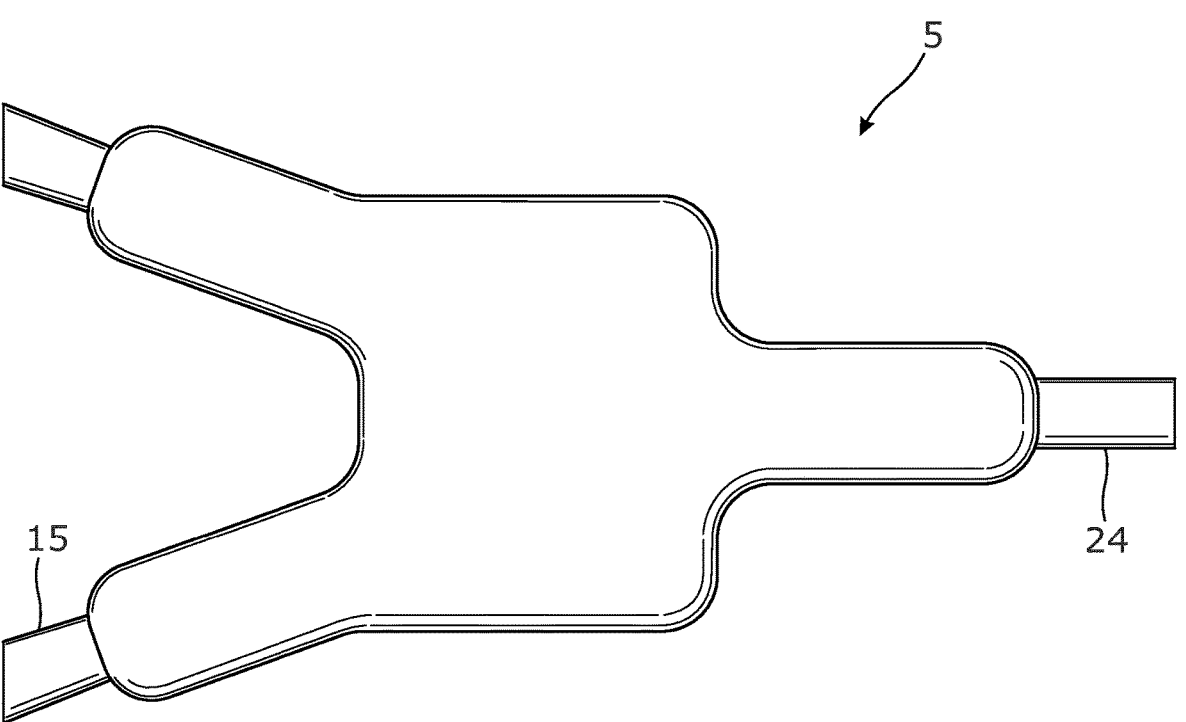

In FIG. 21 another embodiment of the root connection block 5 is shown. In the present embodiment the root connection block 5 is Y-formed, however it functions in the same manner as described in connection with FIG. 20. By having a Y-formed root connection block 5 the weight of the connection block is minimized considerably.

As mentioned before the structural element is conductive and may be manufactured by pultruded parts. The pultruded parts are made in a dry fabric layup and a vacuum assisted resin infusion process, using pre-impregnated glasfiber sheets.

For instance, the structural elements may be manufactured by
    assembling and stacking of several conductive pultruded profiles, infusion and heating into a complete structural element;
    a dry fabric layup followed by a vacuum assisted resin infusion process and heating; or
    layup of pre-impregnated fibre plies followed by vacuum and heating.

Figures 22, 23:
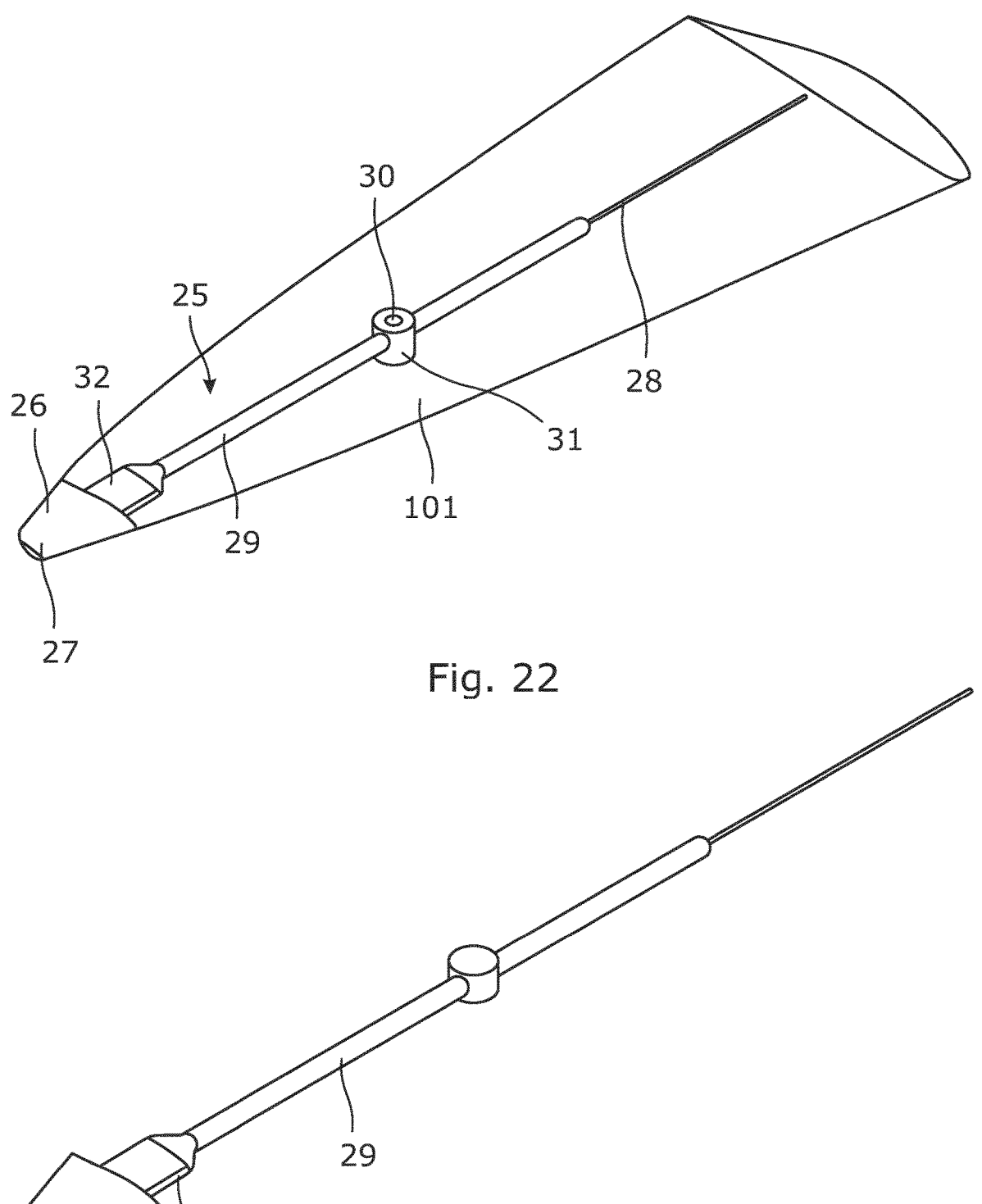
FIGS. 22 to 25 show an embodiment of a tip unit.

FIG. 22 shows a tip unit 25 arranged at the tip end of a wind turbine blade 101. Preferably, the tip unit 25 is attached to the wind turbine blade 101 by means of a suitable adhesive, such as 2-component epoxy adhesives, fast curing polyurethane adhesives, 2-component polyurethane adhesives, 2-component curing acrylate adhesives or other polymeric adhesives.

The tip unit 25, is arranged with its longitudinal axis at least substantially parallel with the longitudinal axis of the wind turbine blade 101 in such a way that the external part 27 of the tip 26 forms the tip of the wind turbine blade 101 and the insulated cable 28 forms the outermost part of a first down conductor extending along the longitudinal axis of the wind turbine blade 101 in the direction of the tip connection block.

The tip unit 25 comprises four electrically conducting elements, namely an external 27 and an internal part 32 of the tip 26, which is electrically and mechanically connected to a side receptor base 31 through an internal tip unit conductor. The internal tip unit conductor is connected to the side receptor base 31 by means of a connection element integrated therein. An insulated electric cable 28, which forms the outermost part of the first down conductor of the lightning protection system, is connected to the side receptor base 31 by means of the same connection element. Thus, all the electrically conducting parts 32, 31, 28 of the tip unit 25 are electrically and mechanically connected to each other.

FIG. 23 shows the insulating material 29 is arranged around the components of the tip unit 25. Thus, apart from the part of the insulated electric cable 28 forming the down conductor from the tip unit 25 and inwards towards the tip connection block and an end part of the internal part 32 of the tip 26, all electrically conducting parts of the tip unit 25 are fully covered by an electrically insulating material 29, such as polymer nanocomposites, thermoplastic materials, thermoset materials insulating foams or any combination thereof. The thickness, geometry and material properties of this insulating material 29 is dimensioned to withstand the environmental conditions (vibrations, temperatures, temperature cycles, humidity, etc.) and the electric fields during lightning exposure and normal operation of the wind turbine blade.

Thus, there are only two ways, in which a lightning strike can reach the internal parts of the tip unit 25 and, thereby the part of the singe down conductor extending through this part of the wind turbine blade 101. One is through a tip receptor of the lightning protection system formed by an external part 27 of the tip 26, which is connected mechanically and electrically to the internal part 32 of the tip 26 through the end part thereof, which is not covered by the electrically insulating material 29. The other way is through a side receptor 30, which is arranged on the outer surface of the shell or to be flush with the shell surface of the wind turbine blade 101 and is not a part of the tip unit 25 itself. The side receptor 30 is mechanically and electrically connected to the side receptor base 31 through penetration of the outer face of the wind turbine blade 101 and the electrically insulating material 29 covering the side receptor base 31. The fact that lightning strikes can only reach the internal lightning protection system through the tip receptor and side receptor 30 arranged on the outer face of the wind turbine blade 101 means that no lightning strikes pass through the structural parts of this part of the wind turbine blade 101. Thereby, the risk of damage or even destruction of the structural parts of the tip of the wind turbine blade 101 is eliminated or at least significantly reduced.

At the ends of the cylinder-shaped parts of the tip unit 25 around the side receptor base 31, the insulating material 29 forms recesses in its surface for the placement of an adhesive material.

Figure 24:
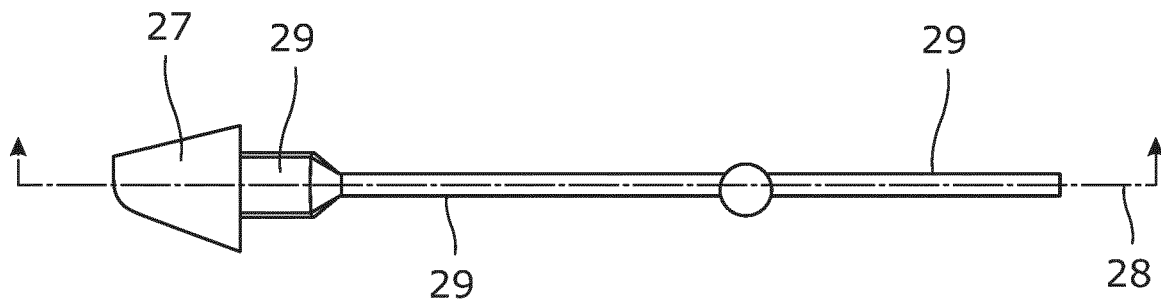
Figure 25:
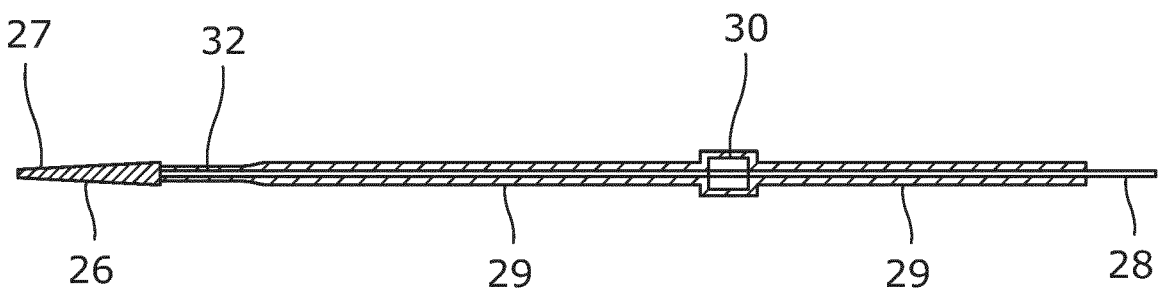

FIGS. 24 and 25 are a side view and a cross-sectional view, respectively, of the tip unit 25 shown in FIG. 23.

Figure 26:
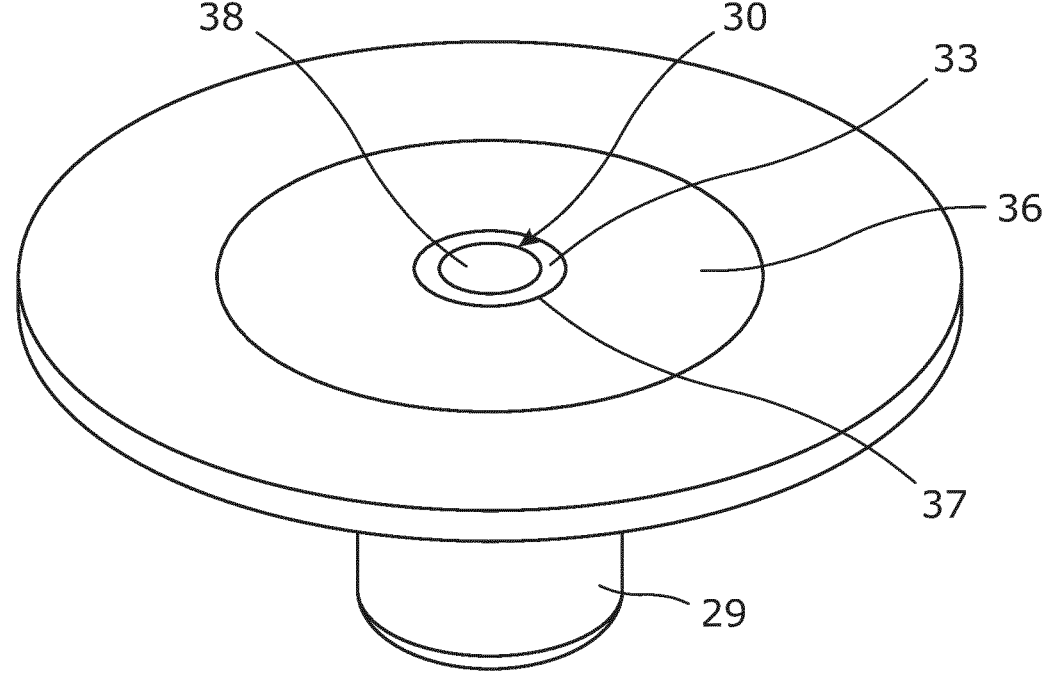

FIG. 26 illustrates schematically a side receptor 30. The side receptor 30 is mounted within the outer face of the wind turbine blade, preferably aligned therewith, and mechanically and electrically connected with a side receptor base arranged within the wind turbine blade and covered by an insulation. In a not shown embodiment the side receptor 30 may be formed as a bolt, the connection to the side receptor base consists simply in a threaded connection.

Figures 27A, 27B, 28, 29:
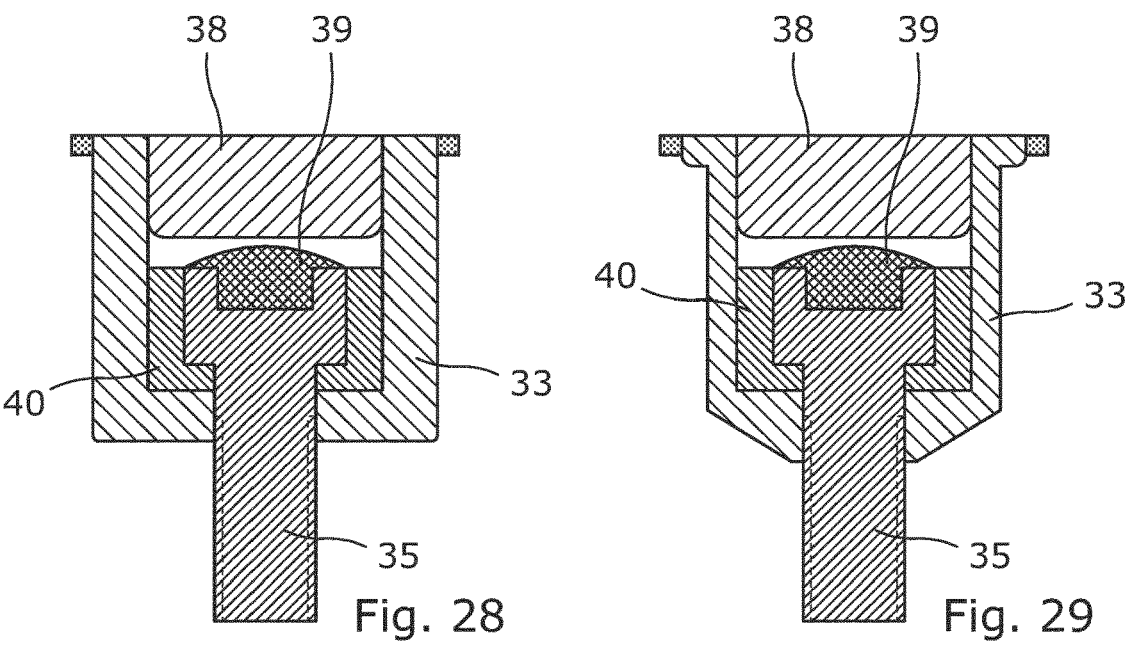

FIGS. 26 and 27a are a perspective view and a cross-sectional view, respectively, of a receptor assembly in the form of a side receptor 30 mounted within the outer face of a wind turbine blade. A receptor cylinder 33 constitutes the electrically conducting part of the side receptor 30. Its upper circular end forms the external part of the side receptor 30 being substantially aligned with the surface of the wind turbine blade when the side receptor 30 is mounted therein. This is the part being impacted by lightning strikes.

The opposite end of the receptor cylinder 33 forms a contact surface 34 through which the lightning current passes from the side receptor 30 into the side receptor base 31 to which the side receptor 30 is connected. The receptor cylinder 33 is mechanically connected to the side receptor base 31 by means of a mounting bolt 35, the head of which is concealed within the receptor cylinder 33 and the thread part of which protrudes through a centered hole in the contact surface 34 of the receptor cylinder 33.

In the embodiment illustrated in these figures, the contact surface 34 is plane and perpendicular to the longitudinal axis of the receptor cylinder 33. In other embodiments, the contact surface 34 or at least a part thereof can be slanted.

FIG. 27a shows how the insulation 29 covers the side receptor base 31 as well as the side receptor 30 connected thereto. This is very important for ensuring that the lightning strikes do, in fact, pass through the side receptor 30 rather than bypassing it by penetrating the shell of the wind turbine blade next to the side receptor 30 on its path to the side receptor base 31 and the down conductor inside the wind turbine blade.

A washer can be arranged between the head of the mounting bolt 35 and the internal surface of the receptor cylinder 33 for securing the mounting bolt 35.

In the illustrated embodiment, the side receptor 30 comprises an optional blade surface protection 36 in the form of a circular sheet of a heat resistant material arranged around the receptor cylinder 33 for protecting the outer face of the wind turbine blade against being damaged from the excessive heat energy following lightning strikes impacting the side receptor 30. Advantageously, this blade surface protection 36 is adhered to the surface of the wind turbine blade during the mounting of the side receptor 30 therein.

A sealant 37 ensures a tight connection between the side receptor 30 and the surrounding outer face of the wind turbine blade.

The open end of the receptor cylinder 33 is closed by a receptor plug 38, which may either be made from a solid electrically conducting or insulating material or consist of a heat-resistant paste. This receptor plug 38 covers and protects the head of the mounting bolt 35 from being damaged from impacting lightning strikes. A screw cap 39 protects the slot of the mounting bolt 35, for instance against entrance of paste, if the receptor plug 38 consists of such a paste.

Furthermore, this embodiment of the side receptor 30 comprises a bolt insulator 40 arranged around the head of the mounting bolt 35 for ensuring electrical insulation between the mounting bolt 35 and the receptor cylinder 33 so that the lightning current is forced to pass through the contact surface 34 rather than through the threads of the mounting bolt 35 on its path from the side receptor 30 to the side receptor base 31.

In FIG. 27b another embodiment of a side receptor 30 is shown. The design of this side receptor 30 is substantially as shown in FIG. 27a and described above. In the embodiment shown in FIG. 27b, the receptor cylinder 33 is surrounded by isolation member 60. The isolation member 60 is made of an isolation material and ensures electrical isolation in addition to the sealing 40.

FIG. 28 is an enlarged cross-sectional view of the side receptor 30 of the two previous figures, whereas FIG. 29 is a cross-sectional view of a receptor assembly in the form of a side receptor 30 according to another embodiment.

One difference from the embodiment shown in FIG. 28 is that in the embodiment shown in FIG. 29, the receptor cylinder 33 is provided with a receptor ruff extending outwards from the upper circular end of the receptor cylinder 33. Such a receptor ruff is useful for ensuring a tight and weather-resistant connection between the side receptor 30 and the surrounding outer face of the wind turbine blade and provides additional material for the arc root erosion and, hence, the natural wear of the side receptor 30.

Furthermore, the edge of the receptor cylinder 33 is beveled in such a way that at least a part of the contact surface 34 is slanted. This increases the area of the contact surface 34 and thereby improves the electrical connection to the side receptor base 31. Furthermore, it ensures a better mechanical stability of the connection between the side receptor 30 and the side receptor base 31.

Figure 30:
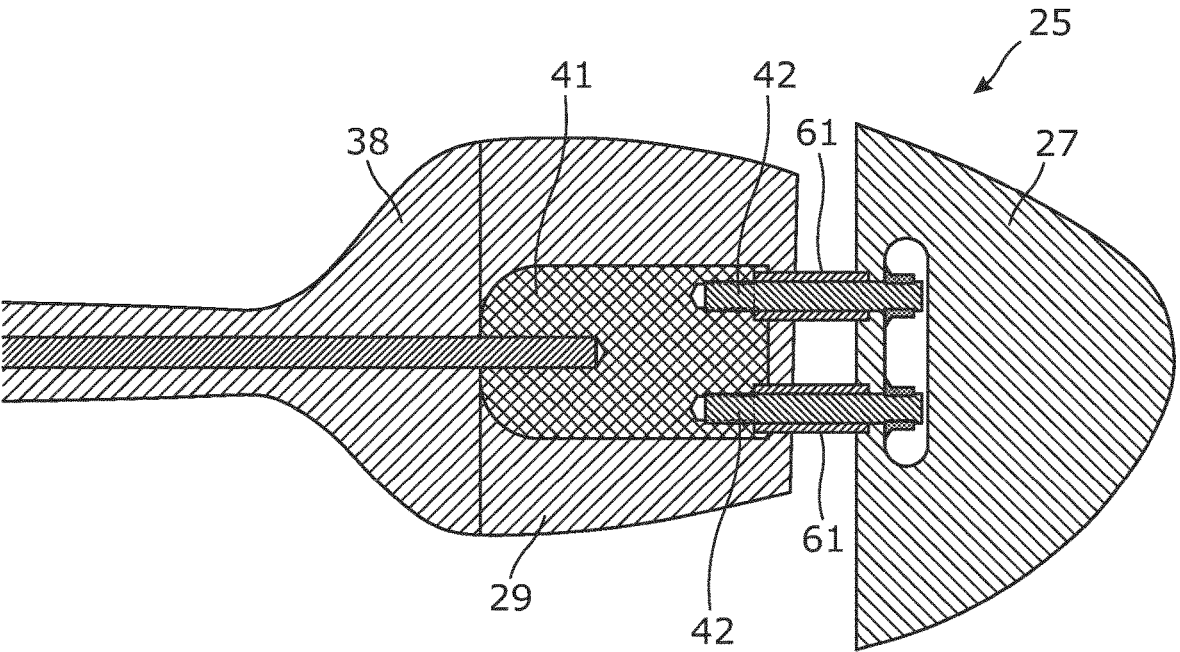
FIG. 30 shows another embodiment of a tip unit.

FIG. 30 is a cross-sectional view of a receptor assembly in the form of a tip receptor assembly.

In this embodiment of the invention, a tip receptor 27 is mounted to a tip receptor base 41 by means of two threaded rods 42. These threaded rods 42 are screwed into threaded holes within the tip receptor base 41 and an electrically conducting bushing 61 is arranged around each of the threaded rods 42. The free ends of the threaded rods 42 are put into holes in the surface of the tip receptor 27 facing towards the tip receptor base 41, and nuts are mounted and tightened around these ends of the threaded rods 42 within the tip receptor 27 through an opening in the side of the tip receptor 27. In another not shown embodiment the tip receptor may be mounted by means of a single threaded rod or bolt. An alignment member may be present for aligning the tip receptor to the tip receptor base.

This means that the tip receptor 27 is in mechanical and electrical contact with one end of the conducting bushings 61 and the tip receptor base 41 is in mechanical and electrical contact with the other end of the conducting bushings 61. The figure illustrates, how the tip receptor base 41 is covered by a layer of electrically insulating material 29, through which two openings gives access for the threaded rods 42 and the surrounding bushings 61 to be in electrical and mechanical contact with the tip receptor base 41.

The fact that the lightning current tends to pass along the surfaces of conductors rather than through the more central parts thereof means that the vast majority of the lightning current passes through the conducting bushings 61 and only a negligible part passes through the threaded rods 42, which are therefore not damaged, when the receptor assembly is subject to a lightning impact. Thus, the threaded rods 42 and the nuts are kept intact and can be used normally in case of the need for replacement of the tip receptor assembly or parts thereof.

The opening, through which the nuts are mounted, can be closed with a receptor plug (not shown) consisting, for instance, of a heat resistant paste, such as silicone, or made from a solid material, such as a metal, a plastic material, rubber or fibreglass.

Figure 31:
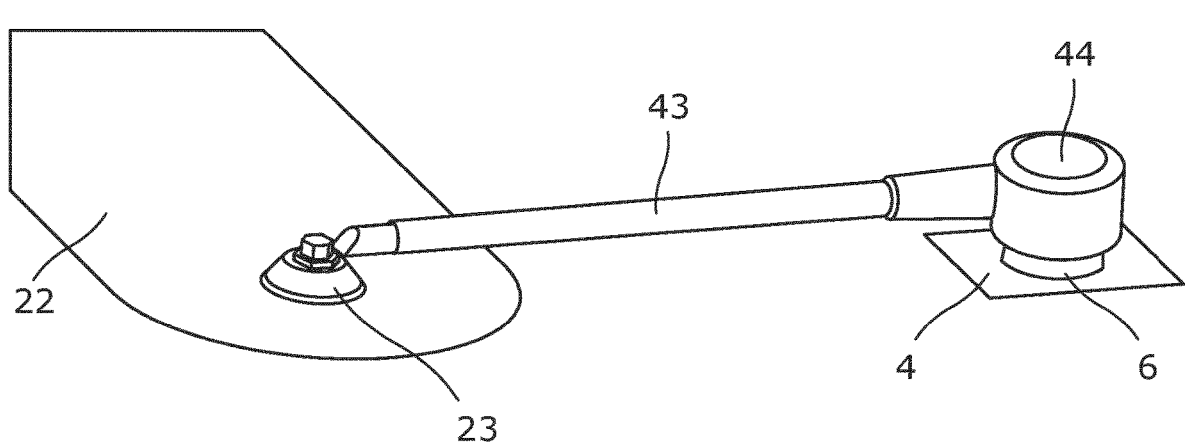
FIGS. 31 to 33 show connection of a connection patch to a conductive connection point.

In FIG. 31 the connection patch 22 is shown. The connection patch 22 has a cable connector 23 being electrically connected with a cable 43. The cable 43 electrically connects the cable connector 23 with a connection point connector 44. The connection point connector 44 is connected with a conductive connection point 6 arranged in the first sheet 4. Hereby is a flexible connection obtained.

Figure 32:
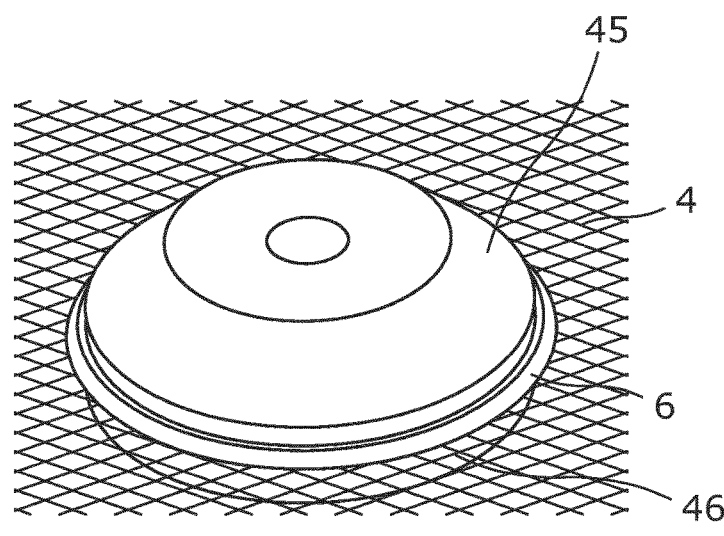
Figure 33:
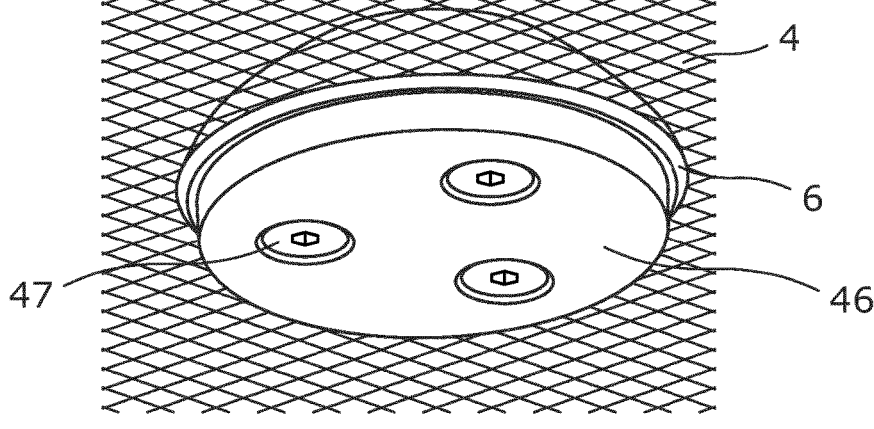

In FIGS. 32 and 33 are shown how the connection point connector 44 is connected with the conductive connection point 6. A first connector disc 45 is arranged on one side of the conductive connection point 6 and a second connector disc 46 is arranged on the opposite side of the conductive connection point thereby encapsulating the conductive connection point 6. The conductive connection point is electrically connected with the first sheet as described earlier. In the present embodiment the first connector disc and the second connector disk are connected by means of connector bolts 47 as seen in FIG. 33.

Figure 34:
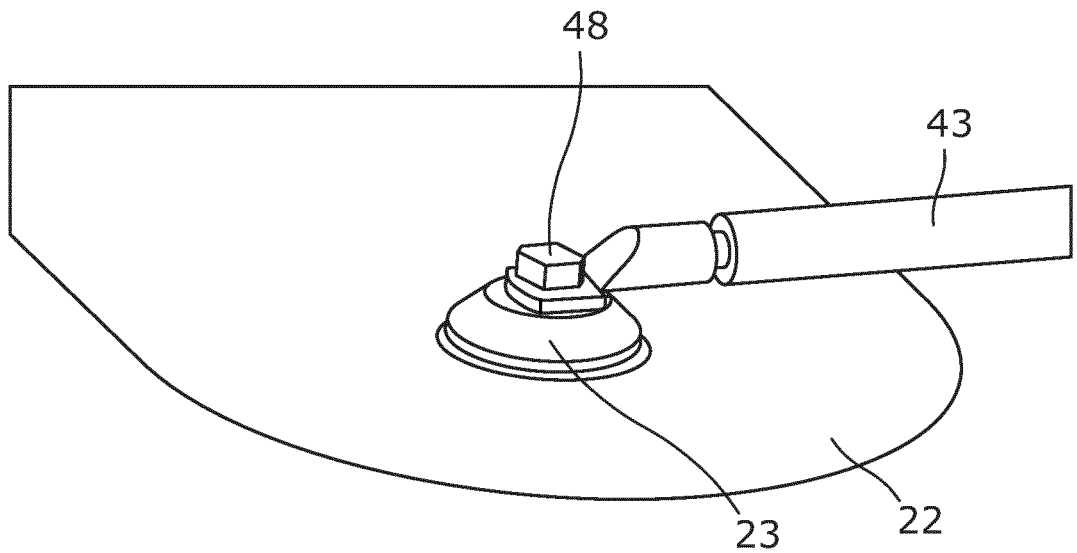
FIG. 34 shows another embodiment of a connection patch.

In FIG. 34 the cable connector 23 of the connection patch 22 is shown. The cable 43 is connected to the cable connector via a bolt head 48. This embodiment assists in ensuring that any manufacturing tolerances may be overcome by the cable 43.

The present invention also relates to a wind turbine blade comprising a root end and a tip end, and a longitudinal axis, a pressure side and a suction side, the pressure side and the suction side are the outer faces of the wind turbine blade, and a structural element extending along the longitudinal axis, the structural element is a spar or beam made of carbon fibre reinforced polymer (CFRP) being electrically conductive, and a lightning protection system as described above.

The present invention also relates to a wind turbine blade comprising a root end and a tip end, and a longitudinal axis, a pressure side and a suction side, the pressure side and the suction side are the outer faces of the wind turbine blade, and a structural element extending along the longitudinal axis, the structural element is a spar or beam made of glass fibre reinforced polymer (GFRP, and a lightning protection system as described above.

Although the invention has been described in the above in connection with preferred embodiments of the invention, it will be evident for a person skilled in the art that several modifications are conceivable without departing from the invention as defined by the following claims.

The invention claimed is:

1. A lightning protection system for a wind turbine blade, wherein the wind turbine blade comprises:
   a root end;
   a tip end;
   a longitudinal axis;
   a pressure side;
   a suction side, wherein the pressure side and the suction side are outer faces of the wind turbine blade; and
   a structural element extending along the longitudinal axis, wherein the structural element is a spar or beam made of carbon fiber reinforced polymer (CFRP) being electrically conductive;
   the lightning protection system comprising:
   a first down conductor extending from the tip end to a tip connection block arranged at a predetermined distance from the tip end, the first down conductor being electrically connected with the tip connection block;
   a second down conductor extending from the tip connection block between and along the structural element and the pressure side towards a root connection block arranged at the root end;
   a third down conductor extending from the tip connection block between and along the structural element and the suction side towards the root connection block;
   the second down conductor comprises a first expanded foil or a first mesh and the third down conductor comprises a second expanded foil or a second mesh, the first expanded foil or the first mesh and the second expanded foil or the second mesh are made of a conductive material; and
   the first expanded foil or the first mesh and the second expanded foil or the second mesh comprise a plurality of conductive connection points, the plurality of conductive connection points are arranged in the vicinity of the tip connection block and the root connection block and are electrically connected with the tip connection block and the root connection block, respectively;
   wherein a plurality of intermediate conductive connection points are arranged opposite the structural element at a predetermined intermediate distance from the tip connection block; and
   wherein the plurality of intermediate conductive connection points are connected with the structural element.

2. The lightning protection system according to claim 1, wherein the predetermined distance is approximately 5 to 25 meters from the tip end.

3. The lightning protection system according to claim 1, wherein the first expanded foil or the first mesh and the second expanded foil or the second mesh are symmetrically arranged on opposite sides in relation to the structural element and are substantially equal in size.

4. The lightning protection system according to claim 1, wherein the plurality of conductive connection points are made of metal or other conductive materials, or a combination thereof.

5. The lightning protection system according to claim 1, wherein the plurality of conductive connection points are directly or indirectly connected with the tip connection block and the root connection block.

6. The lightning protection system according to claim 1, wherein each of the plurality of conductive connection points has a geometry that exhibits an outer and closed curvature with a minimum radius of curvature of between 3 mm to 200 mm.

7. The lightning protection system according to claim 1, wherein the plurality of conductive connection points have a semi-major axis and a semi-minor axis.

8. The lightning protection system according to claim 7, wherein the semi-major axis and the semi-minor axis are different providing an oval or elliptic outer periphery.

9. The lightning protection system according to claim 7, wherein the semi-major axis is oriented in a predetermined angle in relation to the longitudinal axis of the wind turbine blade.

10. The lightning protection system according to claim 9, wherein the predetermined angle is between 0 degrees and 90 degrees.

11. The lightning protection system according to claim 1, wherein each of the plurality of conductive connection points has an edge or outer periphery, and a current density at the edge or the outer periphery is not greater than 1500 A/mm.

12. The lightning protection system according to claim 1, wherein each of the plurality of conductive connection points has a thickness larger than 0.5 mm.

13. The lightning protection system according to claim 12, wherein the thickness of each of the plurality of conductive connection points extends in a first direction with respect to one side of the first expanded foil or the first mesh and the second expanded foil or the second mesh parallel with respect to a thickness direction of the first expanded foil or the first mesh and the second expanded foil or the second mesh, and in a second direction with respect to an opposite side of the first expanded foil or the first mesh and the second expanded foil or the second mesh parallel with respect to the thickness direction of the first expanded foil or the first mesh and the second expanded foil or the second mesh, wherein the first direction is opposite to the second direction.

14. The lightning protection system according to claim 1, wherein a receptor bolt is screwed through one of the plurality of conductive connection points and into the tip connection block or the root connection block.

15. The lightning protection system according to claim 1, wherein the predetermined intermediate distance is less than 1500 mm.

16. The lightning protection system according to claim 1, wherein a conductive material of the first expanded foil or the first mesh and the second expanded foil or the second mesh is metal, such as aluminum, copper, steel or associated alloys.

17. The lightning protection system according to claim 1, wherein the first expanded foil or the first mesh is arranged so as it at least fully covers a first side of the structural element facing the pressure side, and the second expanded foil or the second mesh is arranged so as it at least fully covers a second side of the structural element facing the suction side.

18. The lightning protection system according to claim 17, wherein a length of the first expanded foil or the first mesh and the second expanded foil or the second mesh is equal to or longer than a length of the structural element.

19. The lightning protection system according to claim 1, wherein the tip connection block electrically connects the first down conductor with the first expanded foil or the first mesh and the second expanded foil or the second mesh, respectively, via the plurality of conductive connection points.

20. The lightning protection system according to claim 1, wherein the tip connection block comprises a first receptor base and a second receptor base, the first receptor base is configured to connect the plurality of conductive connection points of the first expanded foil or the first mesh to the tip connection block and the second receptor base is configured to connect the plurality of conductive connection points of the second expanded foil or the second mesh to the tip connection block.

21. The lightning protection system according to claim 1, wherein the root connection block is configured to electrically connect the first expanded foil or the first mesh and the second expanded foil or the second mesh with a single root down conductor.

22. A wind turbine blade comprising:
a root end;
a tip end;
a longitudinal axis;
a pressure side;
a suction side, wherein the pressure side and the suction side are outer faces of the wind turbine blade;
a structural element extending along the longitudinal axis, where the structural element is a spar or beam made of carbon fiber reinforced polymer (CFRP) being electrically conductive; and
a lightning protection system comprising:
   a first down conductor extending from the tip end to a tip connection block arranged at a predetermined distance from the tip end, the first down conductor being electrically connected with the tip connection block;
   a second down conductor extending from the tip connection block between and along the structural element and the pressure side towards a root connection block arranged at the root end;
   a third down conductor extending from the tip connection block between and along the structural element and the suction side towards the root connection block;
   the second down conductor comprises a first expanded foil or a first mesh and the third down conductor comprises a second expanded foil or a second mesh, the first expanded foil or the first mesh and the second expanded foil or the second mesh are made of a conductive material; and
   the first expanded foil or the first mesh and the second expanded foil or the second mesh comprise a plurality of conductive connection points, the plurality of conductive connection points are arranged in the vicinity of the tip connection block and the root connection block and are electrically connected with the tip connection block and the root connection block, respectively;
   wherein a plurality of intermediate conductive connection points are arranged opposite the structural element at a predetermined intermediate distance from the tip connection block; and
   wherein the plurality of intermediate conductive connection points are connected with the structural element.

23. A wind turbine comprising:
a wind turbine blade comprising:
   a root end;
   a tip end;

a longitudinal axis;

a pressure side;

a suction side, wherein the pressure side and the suction side are outer faces of the wind turbine blade;

a structural element extending along the longitudinal axis, where the structural element is a spar or beam made of carbon fiber reinforced polymer (CFRP) being electrically conductive; and a lightning protection system comprising:

a first down conductor extending from the tip end to a tip connection block arranged at a predetermined distance from the tip end, the first down conductor being electrically connected with the tip connection block;

a second down conductor extending from the tip connection block between and along the structural element and the pressure side towards a root connection block arranged at the root end;

a third down conductor extending from the tip connection block between and along the structural element and the suction side towards the root connection block;

the second down conductor comprises a first expanded foil or a first mesh and the third down conductor comprises a second expanded foil or a second mesh, the first expanded foil or the first mesh and the second expanded foil or the second mesh are made of a conductive material; and the first expanded foil or the first mesh and the second expanded foil or the second mesh comprise a plurality of conductive connection points, the plurality of conductive connection points are arranged in the vicinity of the tip connection block and the root connection block and are electrically connected with the tip connection block and the root connection block, respectively;

wherein a plurality of intermediate conductive connection points are arranged opposite the structural element at a predetermined intermediate distance from the tip connection block; and wherein the plurality of intermediate conductive connection points are connected with the structural element.

* * * * *